(12) United States Patent
Kochi et al.

(10) Patent No.: US 9,182,220 B2
(45) Date of Patent: Nov. 10, 2015

(54) IMAGE PHOTOGRAPHING DEVICE AND METHOD FOR THREE-DIMENSIONAL MEASUREMENT

(75) Inventors: Nobuo Kochi, Tokyo (JP); Takuya Moriyama, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 859 days.

(21) Appl. No.: 13/256,543

(22) PCT Filed: Mar. 15, 2010

(86) PCT No.: PCT/JP2010/054365
§ 371 (c)(1),
(2), (4) Date: Nov. 28, 2011

(87) PCT Pub. No.: WO2010/107004
PCT Pub. Date: Sep. 23, 2010

(65) Prior Publication Data
US 2012/0127279 A1    May 24, 2012

(30) Foreign Application Priority Data
Mar. 16, 2009    (JP) .................................. 2009-063659

(51) Int. Cl.
*H04N 13/02*    (2006.01)
*G01B 11/24*    (2006.01)

(52) U.S. Cl.
CPC ................ *G01B 11/24* (2013.01); *H04N 13/02* (2013.01); *G01B 2210/52* (2013.01)

(58) Field of Classification Search
CPC ..................................................... H04N 13/02
USPC ......................................................... 348/50
See application file for complete search history.

(56) References Cited

U.S. PATENT DOCUMENTS 7,268,917 B2 *  9/2007  Watanabe et al. ............. 358/1.9
7,860,276 B2    12/2010  Anai et al.
(Continued)

FOREIGN PATENT DOCUMENTS

| JP | 2007-064627 A | 3/2007 |
| JP | 2007-183256 A | 7/2007 |
| JP | 2008-065807 A | 3/2008 |

OTHER PUBLICATIONS

Japanese Office Action dated May 21, 2013 in Application No. 2009-063659 and its partial English translation.
(Continued)

*Primary Examiner* — Richard Torrente
*Assistant Examiner* — Irfan Habib
(74) *Attorney, Agent, or Firm* — Foley & Lardner LLP

(57) ABSTRACT

An image photographing device for three-dimensional measurement sequentially photographs a measuring object in an overlapping manner by a single camera. The image photographing device for three-dimensional measurement photographs the measuring object with marks having self-other identifiable identification codes, extracts the marks from a photographed image, identifies the identification codes of the marks, defines an area of the measuring object in the photographed image into photographed areas surrounded by the marks, counts a number of photographing times of each of the photographed areas which are involved in different photographed images, groups the photographed areas in response to the number of photographing times, inputs positions of the marks in a coordinate space of a photographing range image of the measuring object, connects the positions of the marks input in the photographing range image such that mark symbols of the marks surrounding the photographed areas correspond to each other to match the photographed areas into the photographing range image, and indicates the photographed areas matched into the photographing range image.

16 Claims, 25 Drawing Sheets

(56) References Cited

U.S. PATENT DOCUMENTS

| | | | |
|---|---|---|---|
| 7,860,302 B2* | 12/2010 | Sato et al. | 382/154 |
| 8,625,086 B2* | 1/2014 | Vogel et al. | 356/141.5 |
| 2004/0070667 A1* | 4/2004 | Ando | 348/46 |
| 2004/0131248 A1* | 7/2004 | Ito et al. | 382/154 |
| 2004/0182930 A1* | 9/2004 | Nojiri | 235/462.04 |
| 2005/0077450 A1* | 4/2005 | Baer | 250/208.1 |
| 2006/0013474 A1* | 1/2006 | Kochi et al. | 382/154 |
| 2006/0017938 A1* | 1/2006 | Ohtomo et al. | 356/611 |
| 2006/0097062 A1* | 5/2006 | Cheong et al. | 235/494 |
| 2007/0065004 A1* | 3/2007 | Kochi et al. | 382/162 |
| 2007/0140528 A1 | 6/2007 | Anai et al. | |
| 2008/0285854 A1* | 11/2008 | Kotake et al. | 382/190 |
| 2008/0309793 A1* | 12/2008 | Onoda et al. | 348/229.1 |
| 2010/0074532 A1* | 3/2010 | Gordon et al. | 382/203 |

OTHER PUBLICATIONS

Masao Iri and Takeshi Koshizuka, "Computational Geometry and Geographic Information Processing," Version 2, Sep. 1986, pp. 126-129.

Franz Aurenhammer, "Voronoi Diagrams—A Survey of a Fundamental Geometric Data Structure," vol. 23, Sep. 1991, pp. 345-405.

* cited by examiner

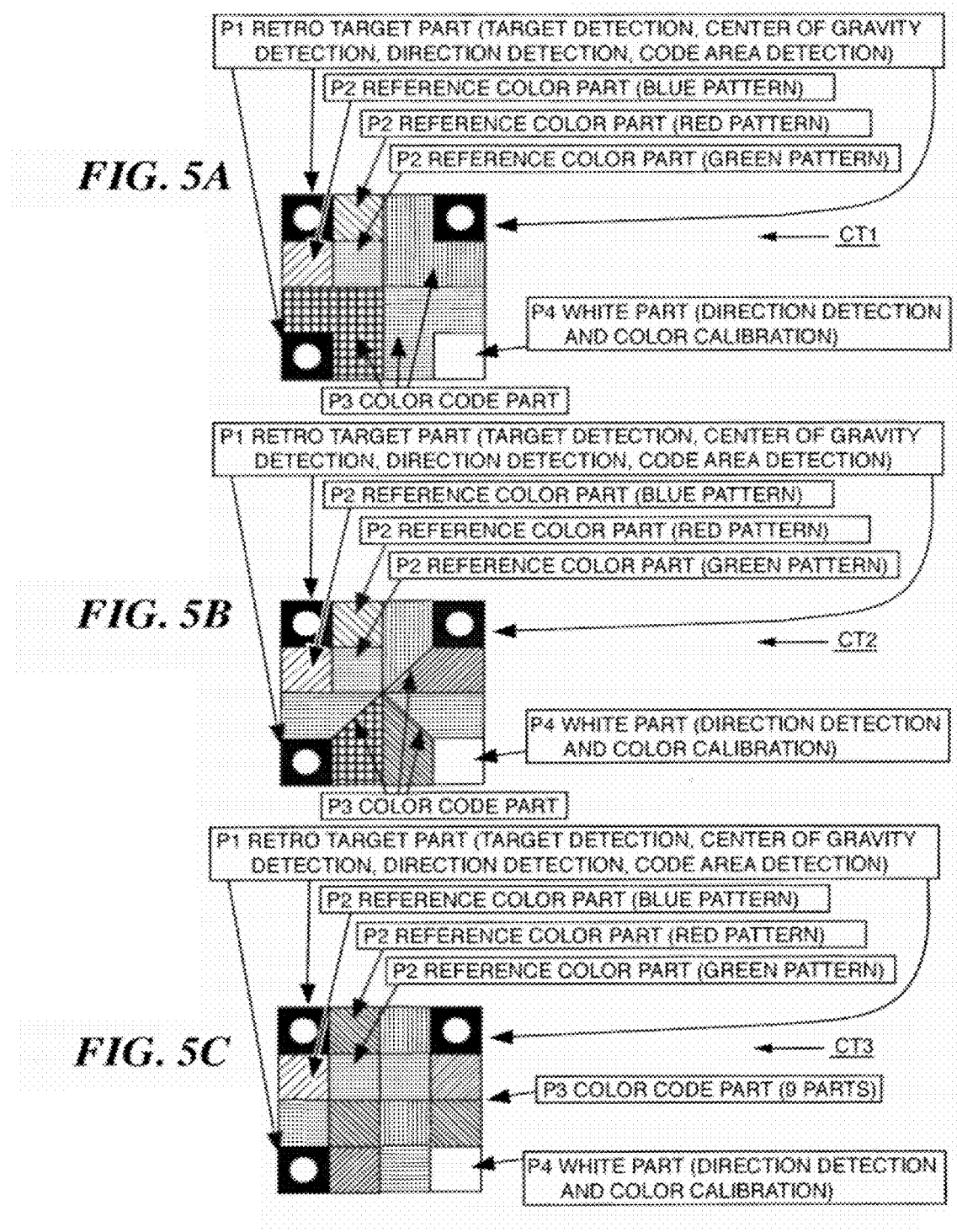

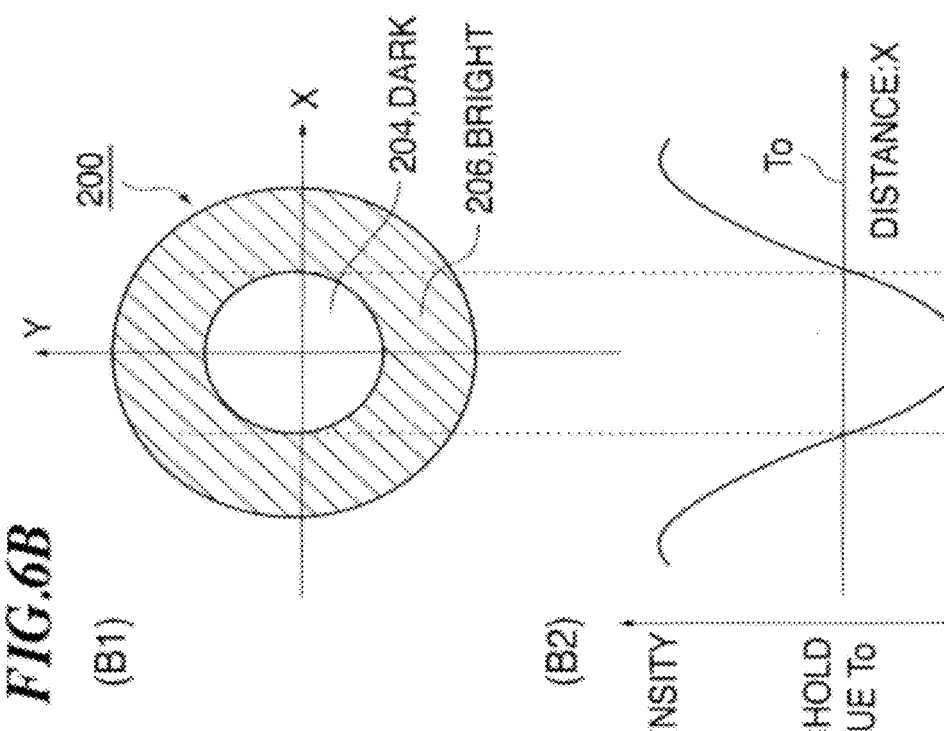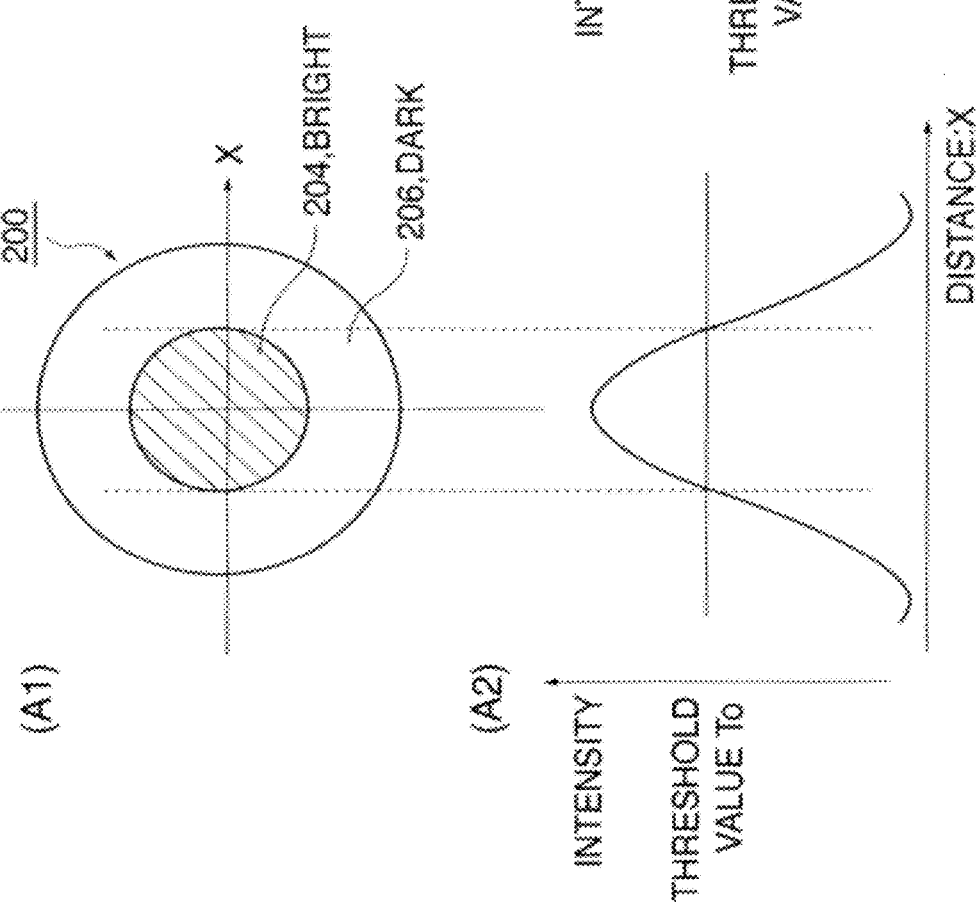

FIG. 19
(a)
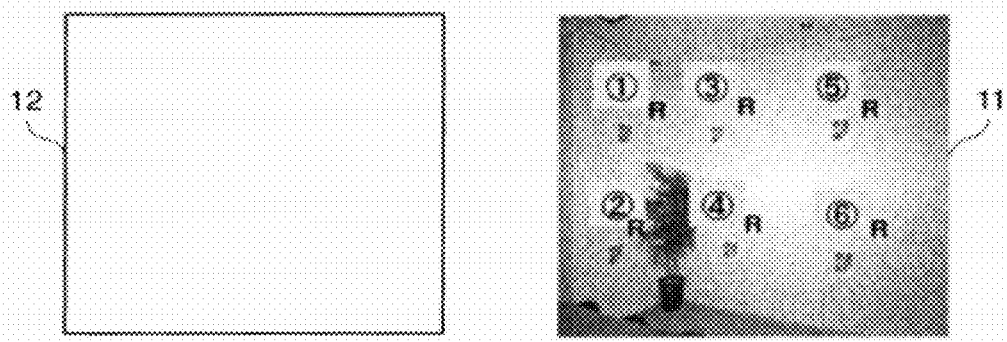
(b)
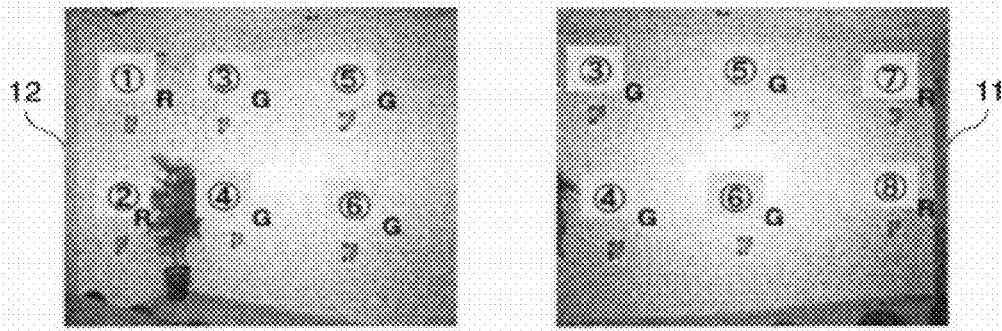

FIG. 22
(a)
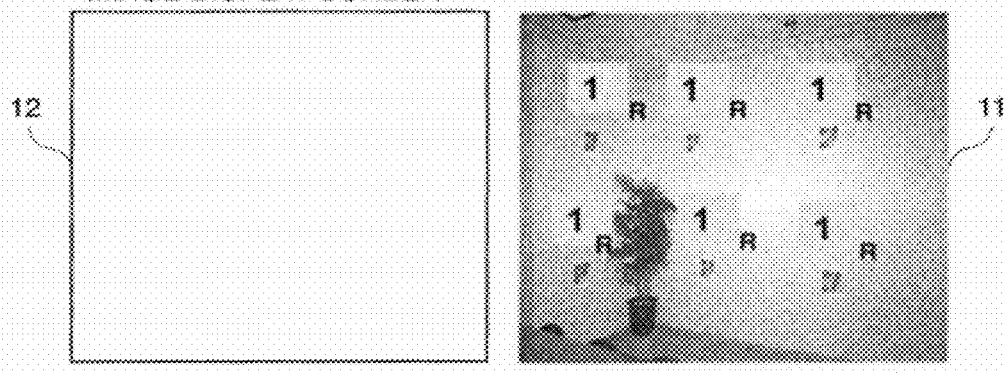
PHOTOGRAPHING
(b)
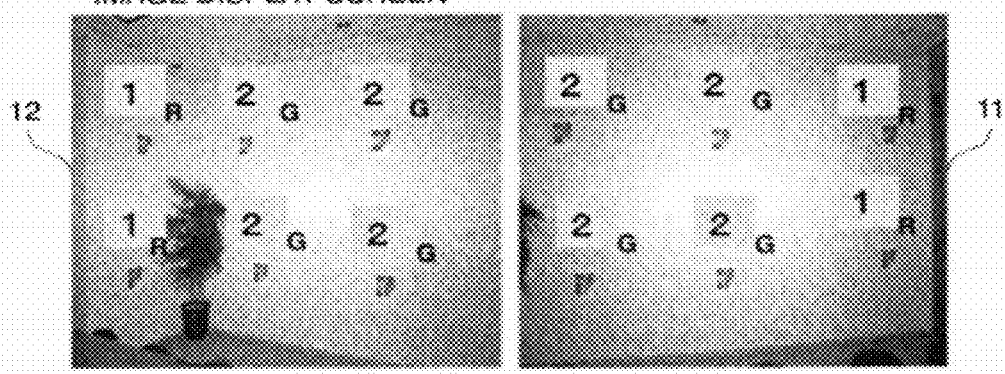

IMAGE PHOTOGRAPHING DEVICE AND METHOD FOR THREE-DIMENSIONAL MEASUREMENT

TECHNICAL FIELD

The present invention relates to an image photographing device and method for three-dimensional measurement, particularly to an image photographing device and method for three-dimensional measurement that present a number of times of photographing each of portions of a measuring object.

BACKGROUND ART

To grasp the whole image of a measuring object and to reconstruct its three-dimensional model image, it is necessary to couple photographed images that are photographed from a plurality of photographing positions. To determine three-dimensional coordinates of the photographing device or the object from the plurality of the photographed images that are photographed by a moving photographer in the above manner, it is necessary to obtain characteristic points (expressing the same points on the object) corresponding with each other between at least two photographed images and to trace those. In such a case, since characteristic points inappropriate for a three-dimensional measurement may appear in the photographed images, an image processing device is proposed that can accurately measure photographing position and orientation of the photographing device or a position coordinate of the object while determining whether or not the characteristic points in the photographed images are appropriate (see Patent Document 1).

Patent Document 1
    JP-A-2007-183256 (FIGS. 1 to 11 and paragraphs [0021] to [0065])

DISCLOSURE OF INVENTION

Problem to be Solved by the Invention

In a case that a photographer photographs a measuring object for three-dimensional measurement with a single camera while moving, it is necessary to photograph the measuring object from multiple directions with images overlapping and to sequentially connect the images together. However, cases such as photographing the measuring object all around, the large and/or wide measuring object, and the measuring object in a geometrically complicated features result in necessity of a large number of images, an unclear overlapping condition of images that are required for three-dimensional measurement, and/or a lack of necessary images. This causes an impaired efficiency such as failure of analysis due to a shortage of photographed images and also causes necessity of returning to a photographing location to photograph again. On the other hand, if a larger number of images are previously set for compensating the shortage of images, this causes more complication in image processing in the analysis and other operations. This results in a problem of impaired efficiency.

FIG. 25 shows an example of the large and/or wide measuring object. This example is a soil volume with the width of several tens meters. Although marks having identification codes are placed on multiple locations on the soil volume, due to the large size of the measuring object, the identification codes cannot be identified if the object is photographed from a remote place to cover a wide range. As a result, this case falls into a shortage of photographed images.

The present invention has been made in consideration of the problems mentioned above, and an object of the present invention is to provide an image photographing device for three-dimensional measurement that enables efficient photographing with just sufficient images in a case that a photographer uses a single camera to photograph while moving. In other words, even if attention is not particularly paid for the identification codes of the marks, a lack of necessary images can be previously prevented if the number of times of photographing each of the marks (how many times it is photographed) is known during photographing. The external appearance of the object can be obtained by photographing it once. However, three-dimensional measurement requires characteristic points photographed to overlap between two photographed images, and therefore the object has to be photographed at least twice. Further, to connect the photographed images together like a panoramic image, each of the characteristic points or the marks used for the connection has to be photographed at least three times. The larger the number of times of photographing each of the characteristic points is, the more the accuracy of three-dimensional measurement of the characteristic points is improved.

Means for Solving the Problem

To achieve the objective, an image photographing device 1 for three-dimensional measurement of Aspect 1, as shown in FIG. 1 for example, is for sequentially photographing a measuring object 2 in an overlapping manner with a single camera, and comprises: a photographing section 3 for photographing the measuring object 2 to which marks having self-other identifiable identification codes are affixed in a predetermined condition; a mark extraction section 71 for extracting the marks from a photographed image photographed by the photographing section 3; a code identification section 72 for identifying the identification codes of the marks extracted by the mark extraction section 71 and correlating the identification codes with mark symbols provided to the marks; a photographed area defining section 81 for identifying the mark symbols of the marks in the photographed image extracted from positions in a screen with the identified identification codes and for defining an area of the measuring object 2 in the photographed image into photographed areas each of which is surrounded by at least three marks (each of the areas including the at least 3 marks) with identified mark symbols; an area photographing time number counting section 83 for counting a number of photographing times of each of the photographed areas which are involved in different photographed images; a photographed area grouping section 84 for grouping the photographed areas into at least two groups in response to the number of photographing times of each of the photographed areas; a mark data inputting section 61 for inputting positions of the marks affixed to the measuring object 2 in a coordinate space of a photographing range image for expressing a photographing range of the measuring object 2 in a two-dimension or three-dimension space while correlating the positions of the marks with the mark symbols; a photographing range image formation section 86 for connecting the positions of the marks input in the photographing range image such that the mark symbols of the marks surrounding each of the photographed areas correspond to each other and thereby matching the photographed areas into the photographing range image; and a display section 4 for displaying the photographed areas matched into the photographing range image such that the photographed areas are grouped into the at least two groups.

Here, the marks having the self-other identifiable identification codes include codes with identification symbols such as number string, character string, and sign, and codes with identification pattern arrangement such as barcode, two-dimensional barcode, and color code. Among those, examples mainly using color codes will be described in embodiments. The mark symbol is indicated, for example, by numbers, characters, signs, and combinations thereof such as "M20." The predetermined condition may be related to mark arrangements. For example, the marks are preferably placed at generally equal intervals on the surface of the measuring object 2 so that the whole view of the measuring object 2 can be grasped. The marks are preferably densely placed in portions having in geometrically complicated and/or largely varied features so that details can be easily grasped. The predetermined condition may be that the position coordinates of the marks are previously designated or that the number of the marks having the self-other identifiable identification codes is previously determined. The number of photographing times of the photographed area may be counted assuming that the photographed area is present, for example, when all the marks surrounding the photographed area are present in a photographing screen. An inputting apparatus such as a keyboard is used when a previously designated position is input by the mark data inputting section 61. However, when a measured three-dimensional position is input, a position coordinate stored in the storage section 5 is read out and automatically input. Accordingly, the mark data inputting section 6 is partially provided in a personal computer (PC). The photographed area is an area surrounded by the at least three marks with identified mark symbols. The photographed area does not necessarily have to correspond to the range of the photographed image (the range that has been actually photographed). For example, it may be a possible target area of photographing such as a certain area that a photographer desires to focus. The photographed area may be the largest polygonal area that is surrounded by the marks on the photographing screen. However, when the polygonal area is found out to overlap partially with other photographed images in such a case, the number of photographing times differs between the overlap portion and the non-overlap portion. Therefore, this area is preferably divided into the overlap portion and the non-overlap portion. The photographed area may be a small area surrounded by three marks. However, since this results in increases of the number of photographed areas and processing amount of the computer, the plurality of small areas with the same number of photographing times are preferably integrated. To find out the overlaps between the photographed images, the photographed area of ½ to ¹⁄₁₀ of the whole photographed image is preferable, and that of ⅓ to ⅕ is more preferable. Assuming that the range covered by all of the photographed areas in the photographed image is smaller than the range that has been actually photographed and that the portions outside the photographed areas have not been photographed, counting the number of photographing times for the areas that have been surely photographed sufficiently ensures overlaps or at the safety side, thus causing no problem in execution of necessary overlap photographing. Matching the photographed areas into the photographing range image means disposing the marks surrounding each of the photographed areas at the coordinate positions in the photographing range image, connecting the marks with lines together, and dividing the surface of the measuring object 2 in the photographing range image into the photographed areas. The photographed images themselves may be affixed to the photographing range image as in an eighth aspect. However, the photographing range image may be only divided and grouped in this aspect. The display section 4 has an image data editing function such as determining positions and colors for group indication in addition to image indication. Accordingly, a portion having this function may be provided in the PC.

With the configuration in accordance with this aspect, the image photographing device for three-dimensional measurement can be provided that enables efficient photographing with just sufficient images in the case that the photographer uses the single camera to photograph while moving. In other words, since the number of photographing times for each photographed area is expressed, the measuring object can be efficiently photographed with just sufficient images. Further, since the marks having the self-other identifiable identification codes are used, the image photographing device has an advantage in automatization of image processing such as connection of the photographed images, the three-dimensional measurement of the mark positions, and formation of the three-dimensional model images.

The image photographing device for three-dimensional measurement of Aspect 2, is that according to Aspect 1, wherein the at least two groups are an overlap photographed area group and a non-overlap photographed area group.

Such a configuration facilitates distinction between the overlap photographed areas which are amenable to three-dimensional measurement and the other non-overlap photographed areas.

The image photographing device for three-dimensional measurement of Aspect 3 is that according to Aspect 1, wherein the predetermined condition is that a number of the marks having the self-other identifiable identification codes are previously determined; further comprising a mark photographing time number counting section 82 for counting the number of photographing times of each of the marks which are involved in different photographed images; and wherein the photographed area grouping section 85 groups at least one photographed area surrounded by marks of a number of photographing times of 0 into the unphotographed area group.

Here, in a case that the position coordinates of the marks are previously determined, the positions of all of the photographed areas are also determined, thus enabling indication of the unphotographed areas. In a case that the position coordinates are unknown, the positions of the unphotographed areas that have not been photographed yet are not determined. In such a case, for example, the unphotographed areas are indicated as a different group as by indicating the whole unphotographed areas in black. Such a configuration facilitates distinction between the already-photographed areas and the unphotographed areas.

The image photographing device for three-dimensional measurement of Aspect 4 is that according to Aspect 3, wherein the at least two groups are an already-photographed area group and the unphotographed area group, or are an at-least-thrice photographed area group, a twice photographed area group, a once photographed area group, and the unphotographed area group.

Such a configuration makes it easy to tell the number of photographing times of each of the photographed areas, thus contributing to efficient photographing with just sufficient images.

The image photographing device for three-dimensional measurement of Aspect 5 is that according to any one of Aspects 1 to 4, wherein the display section 4 displays the photographed areas in the photographing range image in colors correlated with the groups.

Here, the coloring may be achieved with any of brightness, chroma, and hue, and change in brightness such as flashing.

The configuration in accordance with this aspect allows identification between the groups at a glance.

The image photographing device for three-dimensional measurement of Aspect 6 is that according to any one of Aspects 1 to 5, wherein the predetermined condition is that position coordinates of the marks are previously designated, and the positions of the marks input in the photographing range image are the previously designated position coordinates.

Such a configuration enables formation of the photographing range image without three-dimensional measurement and thereby allows a visual grasp of the number of photographing times of each of the photographed areas from the photographing range image.

The image photographing device 1A for three-dimensional measurement of Aspect 7 is that according to any one of Aspects 1 to 5, as shown FIG. 15 for example, further comprises three-dimensional position measurement section 9 for obtaining three-dimensional coordinates of the positions of the marks based on positions of the marks extracted by the mark extraction section 71 in the photographed image on the screen; wherein the positions of the marks input in the photographing range image are the three-dimensional coordinates obtained by the three-dimensional position measuring section 9.

Here, to obtain the two-dimensional or three-dimensional coordinate of the photographing position, for example, TIN (Triangulated Irregular Network) or relative orientation is used. The more photographed images and characteristic points are used, the higher the accuracy of the position coordinates become.

In the configuration in accordance with this Aspect, since the three-dimensional coordinates of a measuring object are obtained and then input, a three-dimensional model image can be accurately reconstructed. Further, the number of photographing times of each of the photographed areas can be visually grasped from the photographing range image.

The image photographing device for three-dimensional measurement of Aspect 8 is that according to any one of Aspects 1 to 7, further comprises a photographed area portion storage section 54 for extracting an image of each of the photographed areas from the photographed images and storing the extracted image, wherein the photographing range image forming section 86 extracts the image of each of the photographed areas from the photographed area portion storage section 54, expands or contracts the image of each of the photographed areas to affix, and affix the image to the photographing range image such that the at least three marks surrounding the photographed area correspond to the positions of the marks input in the photographing range image.

Here, the image of the photographed area to be stored in the photographed area portion storage section 54 can be obtained from any of the photographed images containing the photographed area. However, it is preferable to obtain the image of the photographed area that is photographed in a direction as perpendicular as possible since less deformation is necessary when the image is affixed to the photographing range image. In the configuration in accordance with this Aspect, since the photographed images are affixed to the photographing range image, the more realistic three-dimensional model image can be formed, thus allowing visual determination about shortage or excess of images.

The image photographing device for three-dimensional measurement of Aspect 9 is that according to any one of Aspects 1 to 8, further comprises: a photographed area portion storage section 54 for extracting the image of each of the photographed areas from the photographed image and storing the extracted image; and a boundary line formation section for extracting a plurality of characteristic points in a vicinity of a boundary of the photographed image, drawing a boundary line in each of the photographed areas including the characteristic points, and storing the boundary line in the photographed area portion storage section 54, wherein the photographing range image formation section 86 uses the boundary line drawn in each of the photographed areas stored in the photographed area portion storage section 54 to form a camera photographing range for indicating a range of each of the photographed images in the photographing range image, and the display section 4 indicates the camera photographing range in each of the photographed images, in the photographing range image.

Here, the camera photographing range is formed to indicate the range of any one of the photographed images (first photographed image). The photographed area including the characteristic points is extracted from the first photographed image and a second photographed image having an overlap photographed area. It is preferable to select the photographed image in which the photographed area is photographed as the second photographed image in a direction as perpendicular as possible. In the configuration according to this aspect, the photographing range of the actual camera can be grasped, thus facilitating a grasp of the relationship between the photographed area and the photographing range of the camera.

The image photographing device 1 for three-dimensional measurement of Aspect 10 is that according to any one of Aspects 1 to 9, wherein in a case that a portion of the photographed area of one photographed image overlaps with the photographed area of another photographed image, the photographed area defining section 81 divides the photographed area of the one photographed image into an overlapping portion and a non-overlapping portion, sets the overlapping portion and the non-overlapping portion as new photographed areas, and provides new photographed area numbers to the new photographed areas.

Here, for example, the photographed area may be set as the largest polygonal area surrounded by the marks in the photographed image. In this case, when the polygonal area is found out to partially overlap with the other photographed images, the number of photographing times differs between the overlap portion and the non-overlap portion. Therefore, this area is preferably divided into the overlap portion and the non-overlap portion, thereby obtaining portions in appropriately small sizes. In the configuration according to this Aspect, the photographed area which has been first formed in a large size can be divided into appropriately small portions, thus facilitating view of the photographing range image in which the photographed areas are formed.

The image photographing device 1 for three-dimensional measurement of Aspect 11 is that according to any one of Aspects 1 to 9, wherein in a case that a plurality of photographed areas with the same number of photographing times are present next to each other, the photographed area defining section 81 integrates the plurality of photographed areas into a single photographed area, as a new photographed area, and provides a new photographed area number to the new photographed area.

Here, for example, the photographed area may be set as a small area surrounded by three marks. When the number of the photographed areas increases, the processing amount of the computer also increases. Accordingly, it is preferable to integrate the plurality of small areas with the same number of photographing times together and thereby to obtain an appropriately enlarged portion. In the configuration according to this Aspect, the photographed areas which have been first formed in small sizes can be integrated into the appropriately large portions, thus facilitating view of the photographing range image in which the photographed areas formed.

An image photographing device 1 for three-dimensional measurement of Aspect 12, as shown in FIG. 1, is for sequentially photographing a measuring object 2 in an overlapping manner with a single camera, and comprises: a photographing section 3 for photographing the measuring object 2 to which marks having self-other identifiable identification codes are affixed in a predetermined condition; an mark extraction section 71 for extracting the marks from a photographed image photographed by the photographing section 3; a code identification section 72 for identifying the identification codes of the marks extracted by the mark extraction section 71 and correlating the identification codes with mark symbols provided to the marks; a mark photographing time number counting section 82 for counting a number of photographing times of each of the marks which are involved in different photographed images; a mark grouping section 84 for grouping the marks into at least two groups in response to the number of photographing times of the marks; a mark data inputting section 61 for inputting positions of the marks affixed to the measuring object 2 in a coordinate space of a photographing range image for expressing a photographing range of the measuring object 2 in a two-dimension or three-dimension space while correlating the positions of the marks with the mark symbols; and a display section 4 for providing the mark symbols to the positions of the marks input in the photographing range image and displaying the marks in the at least two groups.

Here, the mark indication indicates a mark position and a mark symbol, either of which may be grouped. When the mark position and the mark symbol are united together, the grouping may be made with respect to the united marks.

In the configuration according to this Aspect, the positions of the marks and the number of photographing times are indicated. This facilitates planning about which marks should be included in the images during later photographing.

The image photographing device for three-dimensional measurement of Aspect 13 is that according to Aspect 12, wherein the at least two groups are an at-least-thrice photographing mark group, a twice photographing mark group, and a at-most-once photographing mark group, and the display section 4 provides the mark symbols to the positions of the marks in the photographing range image and displays the marks in different manners corresponding to the groups.

The configuration according to this Aspect enables understanding of the number of photographing times of the marks at a glance.

The image photographing device for three-dimensional measurement of Aspect 14 is that according to Aspect 12, wherein the predetermined condition is that a number of the marks having the self-other identifiable identification codes are previously determined; the mark grouping section 84 groups the marks with the number of photographing times of at least once into an already-photographed mark group and the marks with the number of photographing times of 0 into an unphotographed mark group; and the display section 4 provides the mark symbols to the positions of the marks in the photographing range image and displays the marks in different manners corresponding to the groups.

Here, in a case that the number of the marks are previously determined and some of the marks have not been photographed yet, it can be known that those marks are included in the unphotographed mark group. Further, in a case that the position coordinates of the marks are previously designated, the positions of all of the marks are also determined, thus enabling indication of the positions of the unphotographed marks. In a case that the position coordinates are unknown, the positions of the unphotographed marks that have not been photographed yet are not determined. In such a case, for example, the unphotographed marks are indicated in groups as by simultaneously indicating the unphotographed marks. The configuration in accordance with this Aspect facilitates clear view of the positions of the unphotographed marks.

The image photographing device for three-dimensional measurement of Aspect 15 is that according to any one of Aspects 1 to 14, wherein the self-other identifiable identification code is any one of number string, character string, sign, barcode, two-dimensional barcode, and color code.

The configuration according to this Aspect facilitates code identification.

The image photographing device for three-dimensional measurement of Aspect 16 is that according to any one of Aspects 1 to 15, as shown in FIG. 19 for example, wherein the photographing section 3 obtains a live image by photographing of the measuring object 2 at a present position by a moving photographer, and the display section 4 displays the photographing range image and the live image on the same screen.

Here, the live image means the image of the measuring object 2 photographed by the moving photographer with a video camera, digital camera, or the like at the present position. Usually, the moving photographer uses the video camera and/or digital camera to display the measuring object in a finder, display, or the like as the live image. In the configuration according to this Aspect, a comparison is made between the already-photographed image and the live image, thereby facilitating a determination whether the photographer has reached a next photographing position. Further, the mark photographing time number after photographing is indicated, thereby further facilitating a determination on the next photographing position.

The image photographing device for three-dimensional measurement of Aspect 17 is that according to claim 12, as shown in FIG. 19 for example, wherein the photographing section 3 obtains a live image by photographing of the measuring object 2 at a present position by a moving photographer, the mark photographing time number counting section 82 counts the number of photographing times including photographing at the present position as the number of photographing times, the mark grouping section 84 groups the marks into groups corresponding to the number of photographing times of the marks, and the display section 4 displays the photographing range image and the live image on the same screen and displays the marks in the groups corresponding to the number of photographing times of the marks.

Such a configuration facilitates a determination whether or not the image should be taken to photograph at the present position.

A photographing device for three-dimensional measurement 1 of Aspect 18, as shown in FIG. 24 for example, is for sequentially photographing a measuring object 2 in an overlapping manner by a single camera, and comprises: a photographing section 3 for photographing a measuring object to which a mark having self-other identifiable identification codes and a non-coded mark which itself is not identifiable affixed in a predetermined condition; a mark extraction section 71 for extracting the marks from a photographed image photographed by the photographing section 3; a code identification section 72 for identifying the identification codes of the marks extracted by the mark extraction section 71 and correlating the identification codes with mark symbols provided to the marks; a non-coded mark identification section for identifying the non-coded mark extracted by the mark extraction section 71 based on an arrangement relationship with respect to the marks having the self-other identifiable identification codes and for providing mark symbols to the non-coded mark; a photographed area defining section 81 for identifying the mark symbols of the marks in the photographed image extracted from positions in a screen with the identifiable identification codes and based on the arrangement relationship with respect to the other marks having the self-other identifiable identification codes and for dividing (defining) an area of the measuring object 2 in the photographed image into photographed areas each of which is surrounded by at least three marks (each of the areas including the at least 3 marks) with identified mark symbols; an area photographing time number counting section 83 for counting a number of photographing times of each of the photographed areas which are involved in different photographed images; a photographed area grouping section 85 for grouping the photographed area into at least two groups in response to the number of photographing times of each of the photographed areas; a mark data inputting section 61 for inputting positions of the marks affixed to the measuring object 2 in a coordinate space of a photographing range image for expressing a photographing range of the measuring object 2 in a two-dimension or three-dimension space while correlating the positions of the marks with the mark symbols; a photographing range image formation section 86 for connecting the positions of the marks input in the photographing range image such that the mark symbols of the marks surrounding each of the photographed areas correspond to each other and thereby matching the photographed areas into the photographing range image; and a display section 4 for displaying the photographed areas matched into the photographing range image such that the photographed areas are grouped into the at least two groups.

Here, an example of the non-coded mark is a retro target. The arrangement relationship can be identified on the basis of the direction and distance from the mark having a particular code, the distance between the non-coded mark and the projection point (the intersection of the vertical line and a side of the triangle) to the triangle formed by three marks having particular codes, or the like. Alternatively, the arrangement relationship is projected onto a three-dimensional space, and the non-coded mark may be identified from the correspondence in the arrangement relationship. The non-coded mark having such an arrangement relationship is unique and identifiable. In the configuration according to this Aspect, the numerous non-coded marks can be effectively used to reconstruct a detailed three-dimensional model image and to achieve three-dimensional measurement.

An image photographing method for three-dimensional measurement of Aspect 19, as shown in FIG. 14 for example, is of sequentially photographing a measuring object 2 in an overlapping manner with a single camera, and comprises: a photographing step (S320) of photographing the measuring object 2 to which marks having self-other identifiable identification codes are affixed in a predetermined condition; a mark extraction step of extracting the marks from a photographed image photographed by the photographing step (S320); a code identification step (S330) of identifying the identification codes of the marks extracted by the mark extraction step and correlating the identification codes with mark symbols provided to the marks; a photographed area defining step of identifying the mark symbols of the marks in the photographed image extracted from positions on a screen with the identified identification codes and for defining an area of the measuring object 2 in the photographed image into photographed areas each of which is surrounded by at least three marks (each of the areas including the at least 3 marks) with identified mark symbols; an area photographing time number counting step of counting a number of photographing times of each of the photographed areas which are involved in different photographed images; a photographed area grouping step (S340) of grouping the photographed area into at least two groups in response to the number of photographing times of each of the photographed areas; a mark data inputting step of inputting positions of the marks affixed to the measuring object 2 in a coordinate space of a photographing range image for expressing a photographing range of the measuring object 2 in a two-dimension or three-dimension space while correlating the positions of the marks with the mark symbols; a photographing range image forming step (S345) of connecting with lines the positions of the marks input in the photographing range image such that the mark symbols of the marks surrounding each of the photographed areas correspond to each other and thereby matching the photographed area into the photographing range image; and a display step (S350) of displaying the photographed areas matched into the photographing range image such that the photographed areas are grouped into the at least two groups.

This Aspect provides a method corresponding to the image photographing device for three-dimensional measurement in accordance with Aspect 1.

Effect of the Invention

According to the present embodiments, the image photographing device for three-dimensional measurement can be provided that enables efficient photographing with just sufficient images in a case that a photographer uses a single camera to photograph while moving.

BRIEF DESCRIPTION OF DRAWINGS

FIG. 5A is a diagram of an example of color-coded target.

FIG. 5B is a diagram of second example of color-coded target.

FIG. 5C is a diagram of third example of color-coded target.

FIG. 6A is a diagram, explaining detection of the center of gravity using an example of a retro target.

FIG. 6B is a diagram, explaining detection of the center of gravity using another example of retro target.

FIG. 19 is a diagram, showing an example (first case) of displaying an already-photographed image and a live image on the same screen.

FIG. 22 is a diagram, showing an example (third case) of displaying an already-photographed image and a live image on the same screen.

This application is based on the Patent Application No. 2009-063659 filed on Mar. 16, 2009 in Japan, the contents of which are hereby incorporated in its entirety by reference into the present application, as part thereof.

The present invention will become more fully understood from the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiment. Among the disclosed changes and modifications, those which may not literally fall within the scope of the patent claims constitute, therefore, a part of the present invention in the sense of doctrine of equivalents.

BEST MODE FOR CARRYING OUT THE INVENTION

Embodiments of the present invention will be described hereinafter in detail with reference to the drawings. In each drawing, like numerals and symbols will be used for identical or like elements, and duplicate descriptions will not be repeated.

First Embodiment

In a first embodiment, an example will be described in which marks and photographed areas are indicated in groups and the positions of the marks input in a photographing range image are previously designated.

[Structure of Image Photographing Device for Three-Dimensional Measurement]

Figure 1:
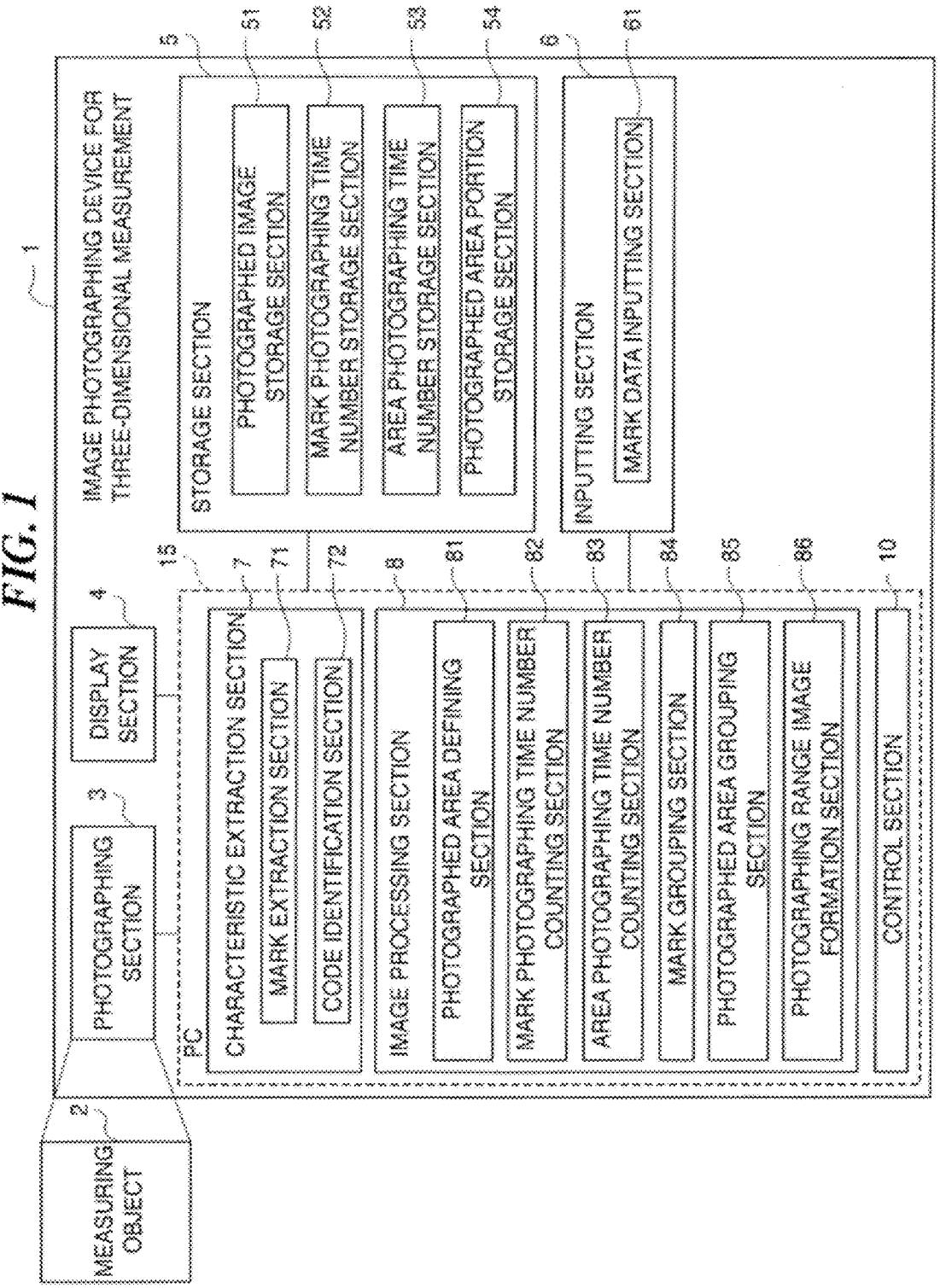
FIG. 1 is a block diagram, illustrating an example of a structure of an image photographing device for three-dimensional measurement in accordance with a first embodiment.

FIG. 1 is a block diagram illustrating an exemplary structure of an image photographing device for three-dimensional measurement in accordance with the first embodiment. An image photographing device 1 for three-dimensional measurement includes a photographing section 3 for photographing a measuring object 2; a display section 4 for displaying photographed images, processed images, positions of the marks and photographed areas, number of photographing times, and so forth; a storage section 5 for storing the photographed images, the processed images, the positions of the marks and the photographed areas, the number of photographing times, and so forth; an inputting section 6 for inputting position data of the marks, and so forth; a characteristic (feature) extraction section 7 for extracting characteristic (feature) points and the marks from the photographed images; an image processing section 8 for performing image processing such as dividing or defining the photographed images into photographed areas, counting the number of photographing times of the marks and the photographed areas, grouping the marks and the photographed areas, and forming the photographing range images, and a control section 10 for controlling the image photographing device 1 for three-dimensional measurement and sections constructing the image photographing device 1. The storage section 5 includes a photographed image storage section 51, a mark photographing time number storage section 52, an area photographing time number storage section 53, and a photographed area portion storage section 54. The inputting section 6 includes a mark data inputting section 61. The characteristic extraction section 7 includes a mark extraction section 71 and a code identification section 72. The image processing section 8 includes a photographed area defining section 81, a mark photographing time number counting section 82, an area photographing time number counting section 83, a mark grouping section 84, a photographed area grouping section 85, and a photographing range image formation section 86.

The image photographing device 1 for three-dimensional measurement in accordance with this embodiment is suitable for photographing in cases of photographing the measuring object 2 all around, the large or wide measuring object 2, the measuring object 2 in geometrically complicated features, and so forth. A photographer uses a single camera as the photographing section 3 to sequentially photograph the measuring object 2 so as to obtain overlap photographed areas while he/she is moving around the measuring object 2. To conduct a three-dimensional measurement, a stereo image is formed with two photographed images sharing the overlap photographed area, characteristic points are extracted from the overlap photographed area, and the three-dimensional coordinates of those characteristic points are obtained. Therefore, the measuring object 2 has to be photographed in an overlapping manner. Marks having self-other identifiable (possible to identify or tell one from the other) identification codes are affixed to the predetermined positions (whose coordinates are predetermined) the measuring object 2 and are used as the characteristic points. Since the marks are identifiable, an operation to search corresponding points in the stereo image is not required, thereby allowing an efficient three-dimensional measurement. Further, a photographing range can be determined on the basis of the marks, thus improving efficiency of photographing.

The photographing section 3 is constituted including a single camera such as a video camera or a digital camera. The moving photographer photographs the measuring object 2 with the video camera or the digital camera at a present position to obtain a live image, and the live image is displayed on a finder, a display, or the like. The photographed image which is a still image is obtained by a shutter operation. In a video camera, the photographed image is usually stored in an external memory by the shutter operation. However, if there is an internal memory, the photographed image can be stored therein. In a digital camera, the photographed image is stored in an internal memory by a shutter operation. During photographing, the measuring object 2 is photographed so that the at least three marks are involved in order to obtain the photographed area. Here, the photographed area is obtained by dividing the area of the measuring object into areas each of which is surrounded by at least three marks (each of the areas includes the marks).

The display section 4 has a display such as a liquid crystal display. The display section 4 at least displays the photographing range image of the measuring object 2 and indicates the positions of the marks and the photographed areas, the number of photographing times, and so forth. During this indication, the photographed areas of the measuring object 2 are indicated in at least two groups. Other than those, the photographed images, the processed images, ortho images, panoramic images, and so forth may be displayed. The display section 4 may include a speaker if outputting sound for indication. The display section 4 has an image data editing function such as determining positions and colors for group indication in addition to image display. Accordingly, a portion having this function may be provided in a PC (personal computer).

The storage section 5 is constituted with a hard disc, for example, and is used as a database. The storage section 5 includes the photographed image storage section 51 for storing the photographed images and the processed images; the mark photographing time number storage section 52 for storing the number of photographing times of the marks while correlating those numbers with mark symbols; the area photographing time number storage section 53 for storing the number of photographing times of the photographed areas while correlating those numbers with the mark symbols of the marks surrounding the photographed areas; and the photographed area portion storage section 54 for extracting the image of each of the photographed areas from the photographed image and storing the extracted image. As the storage section 5, the internal memory of the camera can be used. However, it is preferable to use a hard disc of a PC 15 since it is suitable for high speed and various kinds of processes. In this embodiment, the photographed images are directly stored in the storage section 5 in the camera with the external memory, and the photographed images are transferred to the storage section 5 in case of the camera with the internal memory.

The inputting section 6 has, for example, a mouse and/or a keyboard and is used by an operator to input data and instructions. The inputting section 6 has the mark data inputting section 61 for inputting the positions of the marks affixed to the measuring object in the coordinate space of the two-dimensional or three-dimensional photographing range image of the measuring object 2 while correlating the positions of the mark with the mark symbols. In this embodiment, previously designated position coordinates are input as the positions of the marks in the photographing range image.

Figure 2:
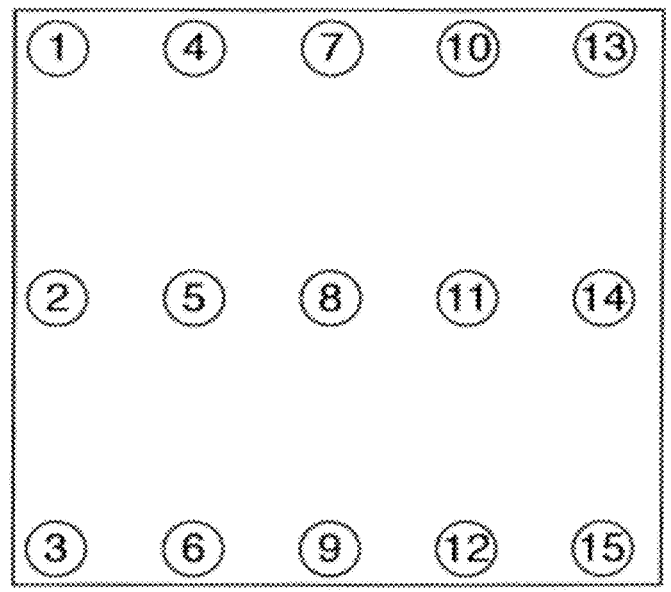
FIG. 2 is a diagram, illustrating an example (first example) of mark positions input in a coordinate space of a two-dimensional photographing range image.

FIG. 2 shows an example of the mark positions that are input in the coordinate space of the two-dimensional photographing range image. This is an example where the measuring object 2 is photographed in multiple directions around the measuring object in an overlapping manner so that the images are connected together and then the images are developed and mapped. The mark symbols (1 in a circle (○) to 15 in a circle (○)) corresponding to the positions of the marks are indicated in the coordinate space in a plan view. This is an example where the mark position and the mark symbol are united together.

Figure 3:
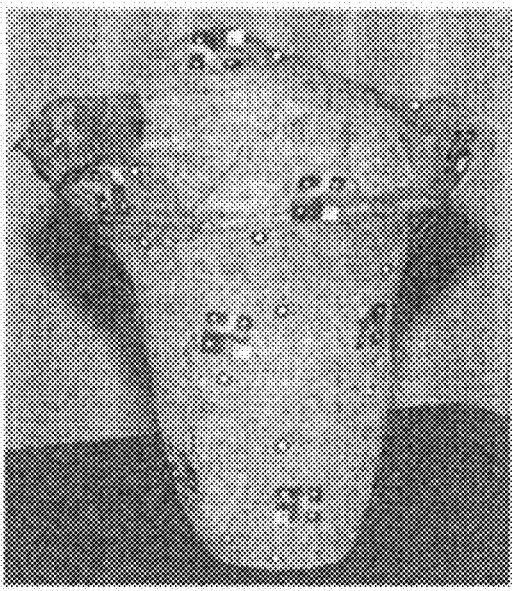
FIG. 3 shows an example of a photographed image in which marks are affixed to an earthenware that is a measuring object.
Figure 4:
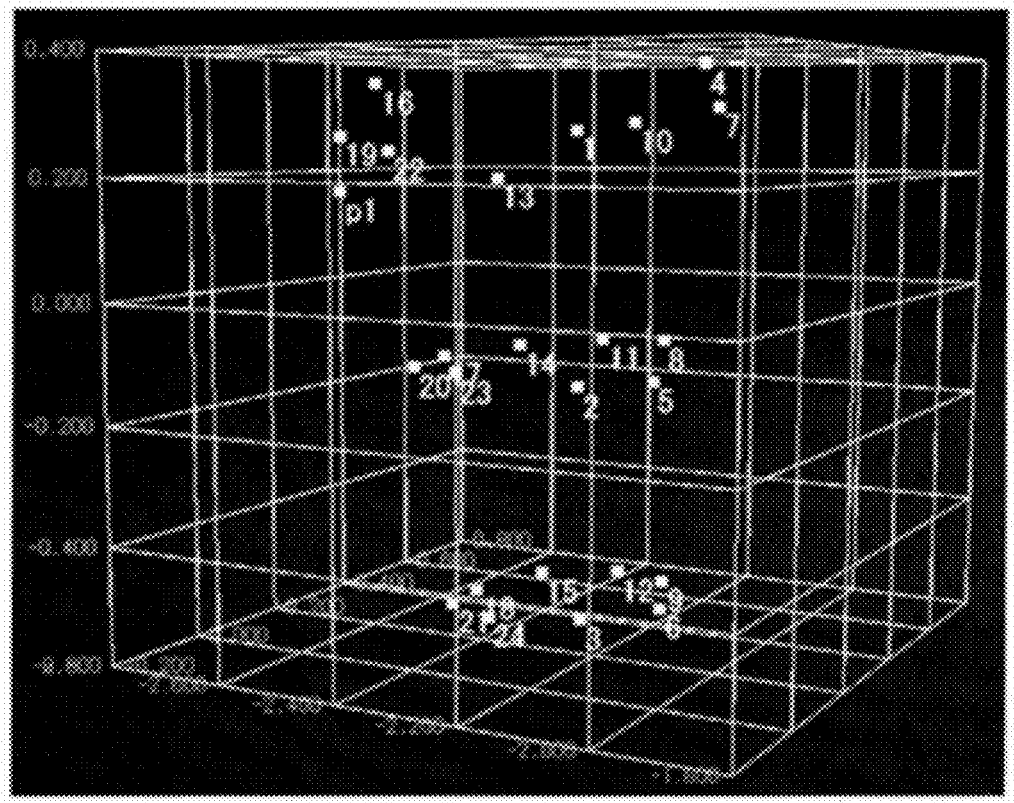
FIG. 4 is a diagram, illustrating an example of mark positions input in a coordinate space of a three-dimensional photographing range image.

FIG. 3 shows the photographed image in which marks (color-coded targets) are affixed to an earthenware that is the measuring object 2. FIG. 4 shows an example of the mark positions that are input in the coordinate space of the three-dimensional photographing range image. The mark positions in FIG. 4 are the mark positions in FIG. 3 that are indicated in the coordinate space of the three-dimensional photographing image. The mark positions are indicated by squares (□) in the coordinate space of a perspective view of the photographed range image. The mark symbols (1 to 24) corresponding to the mark positions are indicated. This is an example where the mark position and the mark symbol are separately indicated.

The characteristic extraction section 7 extracts the characteristic points and the marks from the photographed images. The characteristic extraction section 7 has the mark extraction section 71 for extracting the marks from the photographed images photographed by the photographing section and the code identification section 72 for identifying the identification codes of the marks extracted by the mark extraction section 71 and correlating the identification codes with the mark symbols provided to the marks.

The mark extraction section 71 extracts the characteristic points including the marks in a plurality of photographed images obtained by the photographing section 3. In this embodiment, the color-coded targets as the marks having the self-other identifiable codes are affixed to an automobile or the earthenware that are the measuring objects, and the color-coded targets can be used as the characteristic points.

[Color-Coded Target]

FIGS. 5A, 5B and 5C show examples of color-coded targets CT. FIG. 5A shows a color-coded target with three-color code unit areas, FIG. 5 with six-color code unit areas, and FIG. 5C with nine-color code unit areas. The color-coded targets CT (CT1 to CT3) of FIGS. 5A to 5C include a position detection pattern (retro target part) P1, a reference color pattern (reference color part) P2, a color code pattern (color code part) P3, and an empty pattern (white part) P4.

The retro target part P1 is used for detecting the target itself, its center of gravity, the direction of the target, and a target area.

The reference color part P2 is used as a reference for relative comparison to deal with color deviation due to photographing conditions such as of lighting and camera, or used for color calibration to compensate for color deviation. In addition, the reference color part P2 can also be used for color correction of the color-coded target CT created in a simple way. For example, in a case of using the color-coded target CT printed by a color printer (inkjet, laser or dye-sublimation printer, etc.) that is not color managed, individual differences occur in color depending on the printer that is used. However, the influence of such individual differences can be reduced by relatively comparing the reference color part P2 and the color code part P3 and correcting their differences.

The color code part P3 expresses a code using a combination of colors distributed to respective unit areas. The number of codes that can be expressed varies depending on the number of code colors that are used for codes. For example, in a case that the number of the code colors is n, n×n×n kinds of codes can be expressed. Even under the condition that the unit areas do not use duplicate colors to increase reliability, n×(n−1)×(n−2) kinds of codes can be expressed. When the number of code colors is increased, the number of codes can be accordingly increased. In addition, given the condition that the number of unit areas of the color code part P3 is equal to the number of code colors, all of the code colors are used for the color code part P3. Therefore, the identification code for each unit area can be determined while checking its color not only by comparison with the reference color part P2 but also by relative comparison between the respective unit areas of the color code part P3, to thereby increase reliability. Further, with an additional condition that each unit area has the same size, the unit areas can also be used to detect the color-coded target CT from the image. This is made possible by the fact that even the color-coded targets CT with different identification codes have the areas of respective colors of the same size and hence generally similar dispersion values can be obtained from light detected from the entire color code part. Also, since boundaries between the unit areas where a clear difference in color can be detected come repeatedly at regular intervals, the color-coded target CT can be detected from the image also from such a repeated pattern of detected light.

The white part P4 is used for detecting the direction of the color-coded target and calibrating for color deviation. Of the four corners of the target CT, only one corner does not have the retro target, and this corner can be used for the detection of the direction of the target CT. That corner, or the white part P4, may have a pattern different from the retro target. Thus, the white part may have printed therein a character string such as number for allowing visual confirmation of the code, or may be used as a code area for containing a barcode, etc. The white part may also be used as a template pattern for template matching to further increase detection accuracy.

The code identification section 72 identifies the identification codes of the color-coded targets CT. Using a color-coded target correlation table for recording the correlation between pattern arrangements and code numbers, the code identification section 72 identifies the identification codes by the color arrangements in the color code parts P3 of the color-coded targets CT and provide numbers to the color-coded targets CT.

The position of the color-coded target CT is obtained by detecting the retro target P1. In a case that the retro target is affixed in addition to the color-coded target CT or that the retro target is affixed instead of the color-coded target CT, the mark position is obtained by detecting the retro target.

FIGS. 6A and 6B are drawings for explaining the detection of center of gravity using a retro-target. In this embodiment, the retro-target is formed with two concentric circles. FIG. 6A (A1) shows a retro-target 200 in which the inner circle portion 204 inside the smaller one of the concentric circles is high in intensity, while the outer circle portion 206 or annular portion formed between the small and large circles is low in intensity. FIG. 6A (A2) shows an intensity distribution chart in the diametrical direction of the retro-target 200 of (A1). FIG. 6B (B1) shows a retro-target 200 in which the inner circle portion 204 is low in intensity, while the outer circle portion 206 is high in intensity. FIG. 6B (B2) shows an intensity distribution chart in the diametrical direction of the retro-target 200 of (B1). When the inner circle portion 204 of the retro-target is high in intensity as shown in (A1), the reflected light amount is great to be a bright part on the photographed image of the measured object 1. Therefore, the light amount distribution of the image becomes as shown in FIG. 6A (A2) to make it possible to determine the inner circle portion 204 and the center position of the retro-target from the light amount threshold value T0. In the case of (A1) in this embodiment, a single circle corresponding to the small circle in the center of the square position detecting pattern P1 may be formed. While the part outside the great circle may be either bright or dark, dark is preferable. When that part is dark, substantially a single circle only (small circle) is formed. In the case of (B1), while the part outside the great circle may be either bright or dark. When the part outside the great circle is bright, actually a single dark circle only (small circle) is formed on a bright background.

When the range in which targets are present is determined, the position of center of gravity is calculated for example by the moment method. For example, planar coordinates of the retro-target 200 shown in FIG. 6A (A1) are assumed to be (x, y). Then, equations (1) and (2) are operated for points, in the directions of x and y, where the intensity of the retro-target 200 is not smaller than the threshold T0.

$$xg=\{\Sigma x\times f(x,y)\}/\Sigma f(x,y) \tag{1}$$

$$yg=\{\Sigma y\times f(x,y)\}/\Sigma f(x,y) \tag{2}$$

Coordinates (xg, yg) are those of the position of center of gravity. f(x, y) is the intensity value at the position (x, y).

In the case of the retro-target 200 shown in FIG. 6B (B1), the equations (1) and (2) are operated for points in the directions of x and y where intensity is not greater than the threshold T0. Thus, the position of center of gravity of the retro-target 200 is determined.

In the case that the no color-coded targets or retro targets are used, the mark extraction section 71 extracts the characteristic points from the plurality of photographed images. The characteristic point may be, for example, the position of center, the position of center of gravity, the position of corner of the measuring object 2, the position having characteristic different from the others of the measuring object 2, the mark affixed to or projected onto the measuring object 2, and so forth. A characteristic extraction operator is used for extracting the characteristic points. Herein, an example will be described that uses a MORAVEC operator.

The MORAVEC operator is conventionally used as a characteristic extractor for general purposes. The MORAVEC operator sets 3×3 pixels around a certain pixel of interest as a mask and sets the minimum value of the gray level difference (directional gray level difference) in one-pixel movements of the mask in four directions around the pixel of interest as a characteristic amount of the pixel of interest. Features of the MORAVEC operator is that it is capable of simple and high-speed processing and of relatively easy hardware implementation. To achieve the high-speed processing, a memory having a several times capacity of the image is required. Here, the extraction of the characteristic points by the MORAVEC operator is described. However, another operator such as a Harris operator or any other operators may be used if it is capable of detecting the characteristic points.

Returning to FIG. 1, the image processing section 8 has the photographed area defining section 81 for dividing the area of the measuring object 2 in the photographed image into photographed areas formed with areas surrounded by at least three marks (each of the areas includes the marks) and providing a photographed area number to each of the areas; the mark photographing time number counting section 82 for counting the number of photographing times of each of the marks in different photographed images; the area photographing time number counting section 83 for counting the number of photographing times of each of the photographed areas in different photographed images; the mark grouping section 84 for grouping the marks into at least two groups in response to the number of photographing times of each of the marks; the photographed area grouping section 85 for grouping the photographed areas into at least two groups in response to the number of photographing times of each of the photographed areas; and the photographing range image forming section 86 for connecting the positions of the marks input in the photographing range image such that the mark symbols of the marks surrounding each of the photographed areas correspond to each other and thereby matching the photographed areas into the photographing range image.

The photographed area defining section 81 divides the area of the measuring object 2 into the photographed areas in the photographed image. The area of the measuring object 2 can be divided into multiple areas with polygons with at least three marks being their vertices. In this embodiment, since the purpose is to grasp the overlapping condition of the photographed areas, it is preferable to divide the area into the photographed areas in sizes corresponding to the range of the photographed image. Too many and small photographed areas result in a long-duration image processing, and too large photographed areas falling outside the photographed image disable counting of the number of photographing times. Therefore, the area is preferably divided into the photographed areas in appropriate sizes in response to the range of the photographed image. For example, a range which is within one plane and can be in focus are divided into one to four sections in response to its area. The photographed area may be the largest polygonal area surrounded by the marks in the photographed image (the range of an actually photographed image). However, when the polygonal area is found out to partially overlap with the other photographed images in such a case, the number of photographing times differs between the overlap portion and the non-overlap portion. Therefore, this area is preferably divided into the overlap portion and the non-overlap portion. The photographed area may be a small area surrounded by three marks. However, since this results in increases of the number of photographed areas and processing amount of the computer, the plurality of small areas with the same number of photographing times are integrated together. To find out the overlaps between the photographed images, the photographed area of ½ to 1/10 of the whole photographed image is preferable, and that of ⅓ to ⅕ is more preferable.

Figure 7:
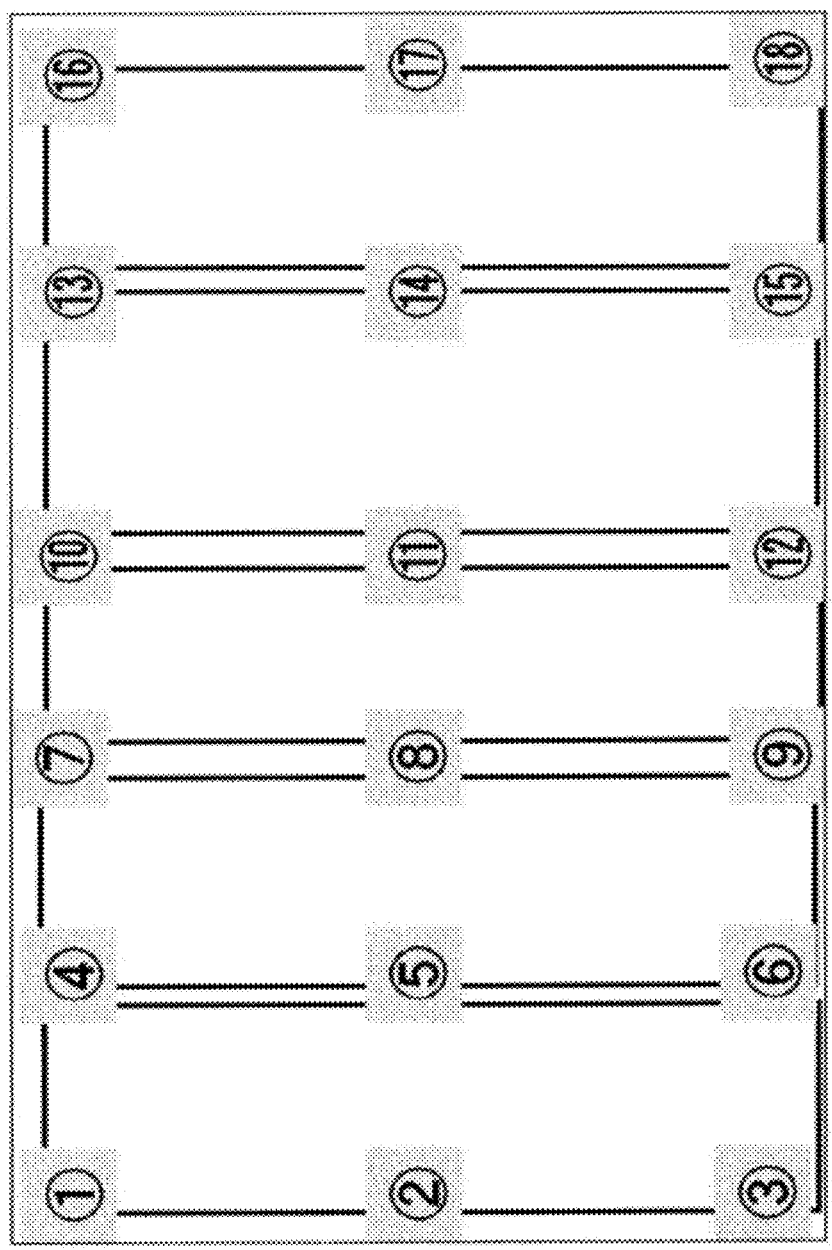
FIG. 7 illustrates an example of formation of photographed areas in the two-dimensional photographing range image.

FIG. 7 shows an example of formation of the photographed areas in the two-dimensional photographing range image. In this example, an area including six marks with the mark symbols (1 in a circle) to (6 in a circle), in other words, an area surrounded by the six marks with the mark symbols (1 in a circle) to (6 in a circle) is defined as a single photographed area. Further, an area including six marks with the mark symbols (4 in a circle) to (9 in a circle), in other words, an area surrounded by the six marks with the mark symbols (4 in a circle) to (9 in a circle) is defined as a single photographed area. Then similarly, definition of areas further progresses, and an area including the six marks with the mark symbols (13 in a circle) to (18 in a circle) is defined as the single photographed area.

Figure 8:
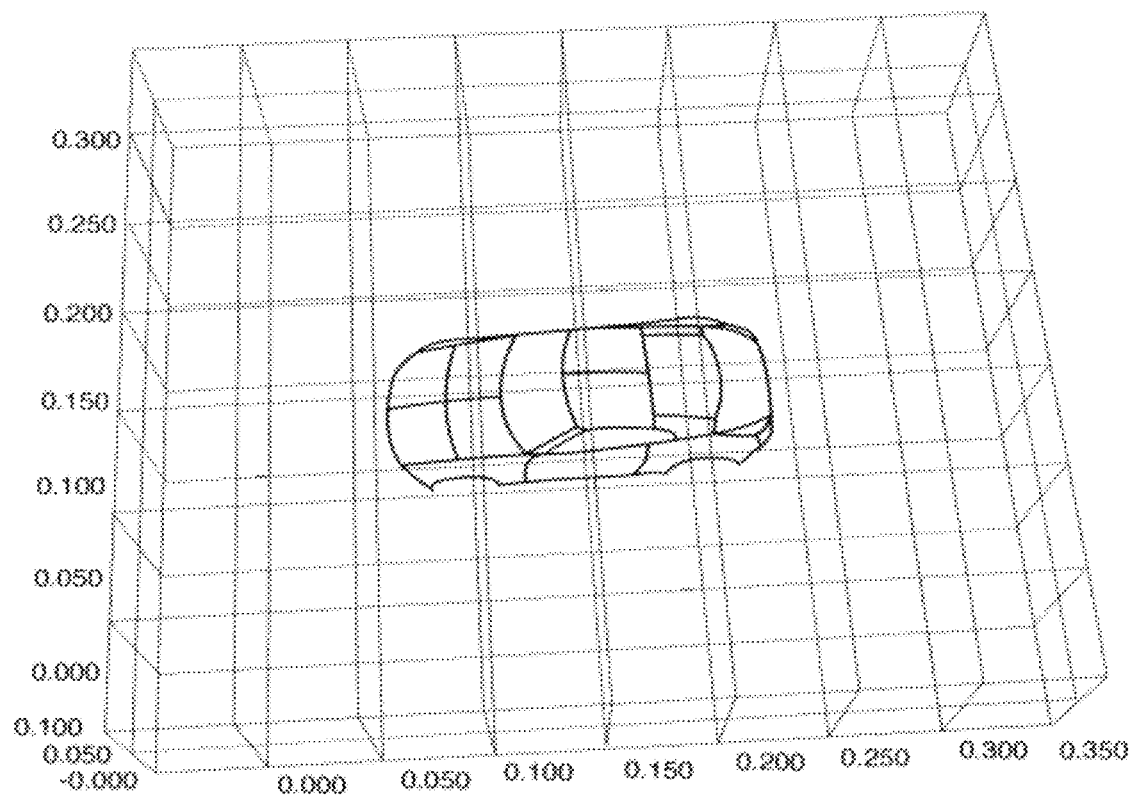
FIG. 8 illustrates an example of formation of photographed areas in the three-dimensional photographing range image.

FIG. 8 shows an example of formation of the photographed areas in the three-dimensional photographing range image. This is an example where an area of an automobile is divided into a plurality of photographed areas in a coordinate space of a perspective view. Many of those areas are rectangles, and an area surrounded by at least three marks is defined as a single photographed area.

The mark photographing time number counting section 82 counts the number of photographing times of each of the marks included in different photographed images. In other words, the mark in each of the photographed images stored in the storage section is extracted, and the frequency of successful extractions is counted as the number of photographing times of the mark. The counted number of photographing times is stored in the mark photographing time number storage section 52 while being correlated with the mark symbol of the mark.

The area photographing time number counting section 83 counts the number of photographing times of each of the areas in different photographed images. In other words, the marks surrounding the photographed area are extracted from each photographed image stored in the storage section 5, and the number of times of successful extractions of all the marks surrounding the photographed area is counted as the number of photographing times of the photographed area. Missing any one of the marks means that the whole photographed area has not been photographed, and this extraction is not counted. The counted number of photographing times is stored in the area photographing time number storage section storage section 53 while being correlated with the mark symbols of the marks surrounding the photographed area. Assuming that the range covered by all the photographed areas in the photographed image is smaller than the range that has been actually photographed and that the portions outside the photographed areas have not been photographed, counting the number of photographing times for the areas that have been surely photographed is in the safety side to ensure overlaps, thus causing no problem in execution of necessary overlap photographing.

The mark grouping section 84 groups the marks into at least two groups in response to the number of photographing times of the marks. For example, the marks are grouped into an at-least-thrice photographing mark group, a twice photographing mark group, a once photographing mark group, and an unphotographed mark group. It is also possible that the marks are grouped into an overlap photographing mark group and a non-overlap photographing mark group, or into an already-photographed mark group and an unphotographed mark group. The grouped marks are stored in the mark photographing time number storage section 52 while being correlated with the mark symbols of the marks.

The photographed area grouping section 85 groups the photographed areas into at least two groups in response to the number of photographing times of the photographed areas. For example, the photographed areas are grouped into an at-least-thrice photographed area group, a twice photographed area group, a once photographed area group, and an unphotographed area group. It is also possible that the photographed areas are grouped into an overlap photographed area group and a non-overlap photographed area group, or into an already-photographed area group and an unphotographed area group. The grouped photographed areas are stored in the area photographing time number storage section 53 while being correlated with the mark symbols of the marks surrounding the photographed areas.

The photographing range image forming section 86 connects the positions of the marks input in the photographing range image such that the mark symbols of the marks surrounding each of the photographed areas correspond to each other, thereby matching the photographed areas to the photographing range image. The mark positions input in the photographing range image are correlated with the mark symbols. Accordingly, the at least three marks surrounding the photographed area with the identified mark symbols are connected together, thereby forming a polygon. This polygon serves as the photographed area in the photographing range image. As described above, the at least three marks surrounding each of the photographed areas are connected together to match all the defined photographed areas into the area of the measuring object 2 (except for invisible portions such as a vehicle bottom). The photographing range image can be thereby formed in which the area of the measuring object 2 in the photographed range image are divided into the photographed areas. The marks input in the photographing range image and the formed photographed areas are indicated in at least two groups by the display section 4.

Figure 9A:
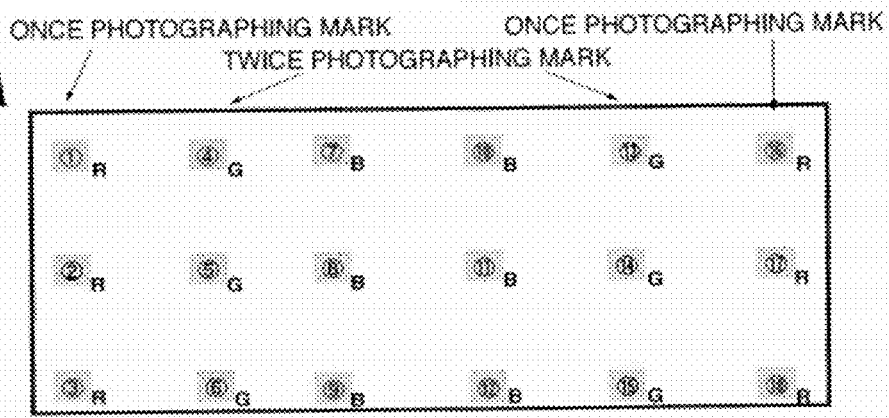
FIG. 9A illustrates indication example of mark groups in the two-dimensional photographing range image.
Figure 9B:
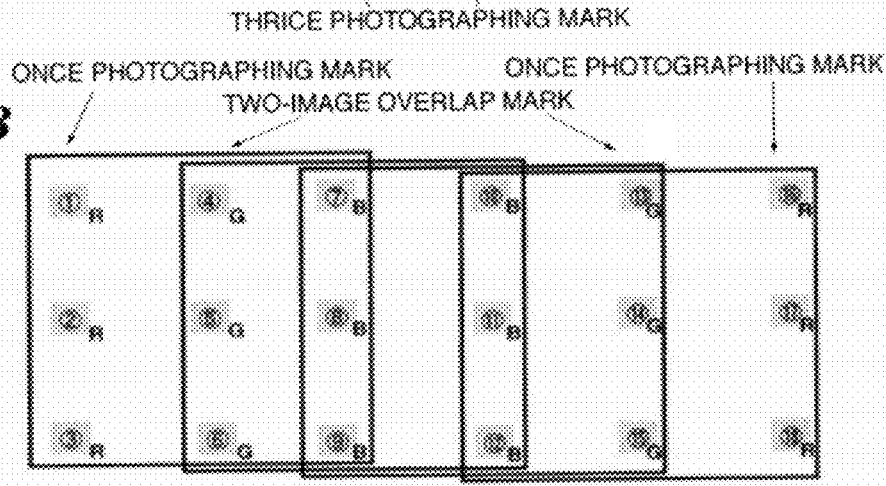
FIG. 9B illustrates second indication example of mark groups in the two-dimensional photographing range image.
Figure 9C:
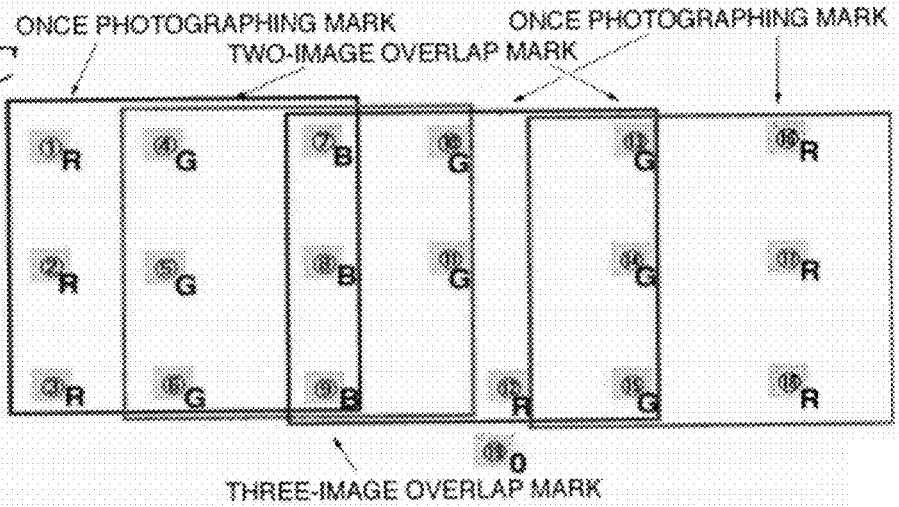
FIG. 9C illustrates third indication example of mark groups in the two-dimensional photographing range image.

FIGS. 9A, 9B and 9C show indication examples of groups of marks in the two-dimensional photographing range image. These are the examples where the marks in FIG. 2 are indicated in groups. However, the number of the marks has increased from 15 to 18. FIG. 9A shows an indication example of the marks in groups. FIG. 9B shows how the photographed images overlap with each other. In FIGS. 9A and 9B, the mark symbols (1 in a circle to 18 in a circle) corresponding to the positions of the marks are provided. The mark symbols are indicated in colors. Red (provided with R) indicates once photographing marks. Green (provided with G) indicates twice photographing marks. Blue (provided with B) indicates thrice photographing marks. FIG. 9C shows an example where in a place in which there should be three overlapping images in the photographed image, the marks (10, 11 in circles) are indicated as the twice photographing marks due to incorrect overlapping, the mark (12 in a circle) is indicated as the once photographing mark due to incorrect overlapping, and there is the unphotographed mark (19 in a circle) (provided with 0).

Figure 10:
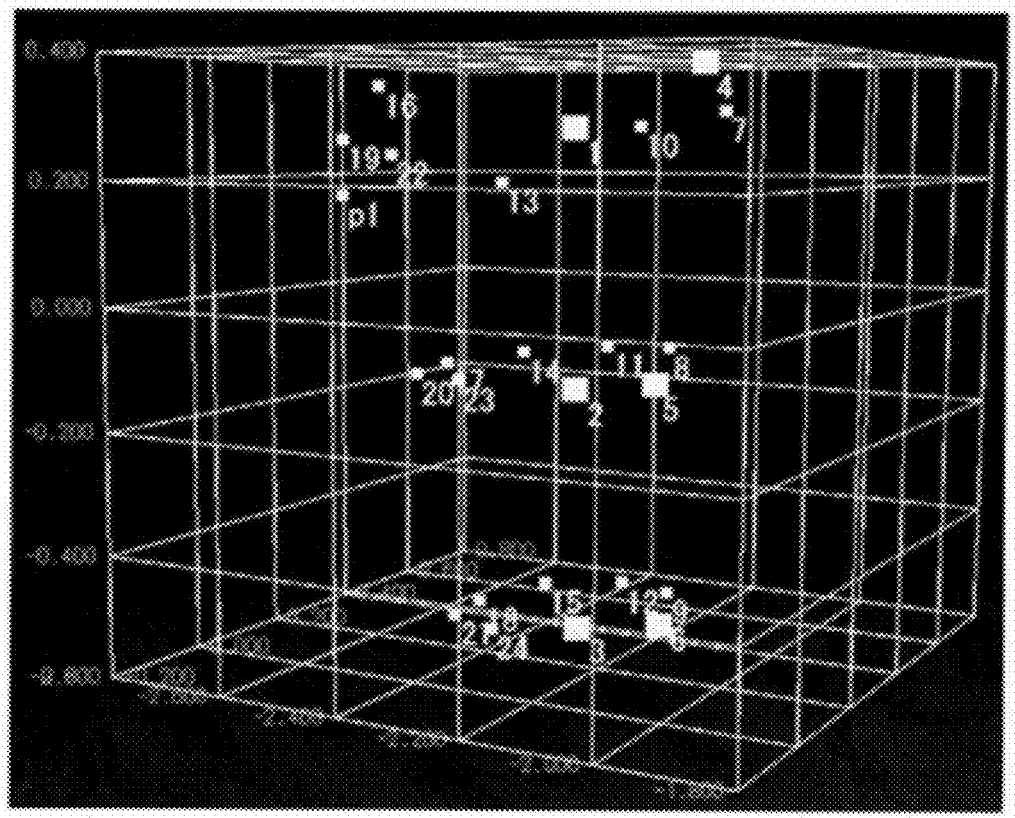
FIG. 10 illustrates an indication example of mark groups in the three-dimensional photographing range image.

FIG. 10 shows an indication example of groups of marks in the three-dimensional photographing range image. This is the example where the marks in FIGS. 3 and 4 are indicated in groups. The mark positions are indicated by squares (□) in the coordinate space of a perspective view. The mark symbols (1 to 24) corresponding to the mark positions are indicated. Among those, the squares (□) are indicated larger for the marks (with the mark symbols 1 to 6) of the non-overlap photographing group (at-most-once photographing group).

Figure 11:
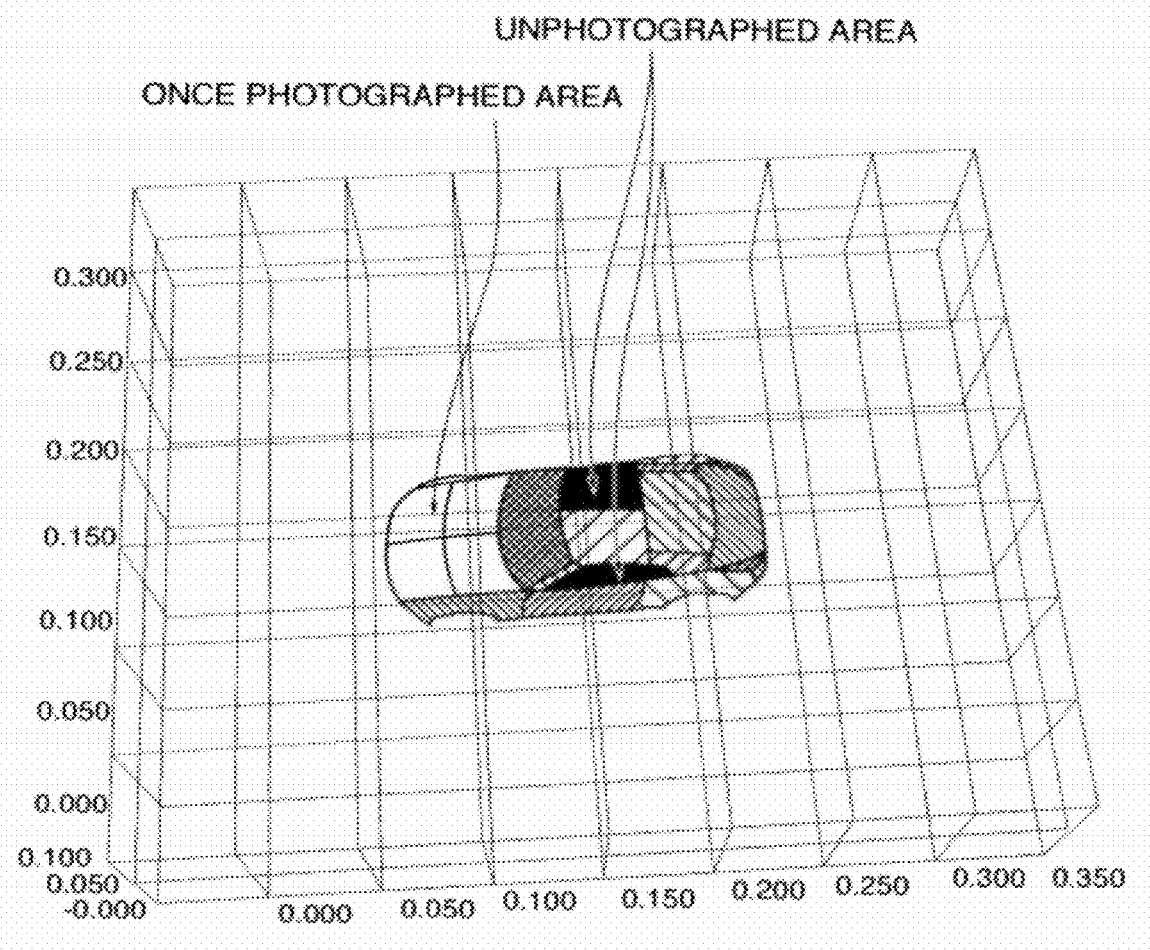
FIG. 11 illustrates an indication example of photographed area groups in the three-dimensional photographing range image.

FIG. 11 shows an indication example of groups of photographed areas in the three-dimensional photographing range image. This is an example where an area of an automobile is divided into the plurality of photographed areas and they are indicated in colors in the coordinate space of a perspective view. The areas indicated in colors (with patterns in FIG. 11) are the overlap photographed areas. The areas indicated in white are the once photographing areas. The areas indicated in black are the unphotographed areas. As described above, the photographed areas are indicated in colors, and the areas in short of images can be visually grasped, thus promoting efficiency of photographing.

Further, for example, the images of the photographed areas are extracted from the photographed images and stored in the photographed area portion storage section 54. In the photographing range image forming section 86, the image of each of the photographed areas are extracted from the photographed area portion storage section 54. The image of each of the photographed areas is expanded or contracted and then affixed to the photographing range image such that at least three marks surrounding the photographed areas correspond to the positions of the marks input in the photographing range image and then the photographing range image can be visually presented.

Figure 12:
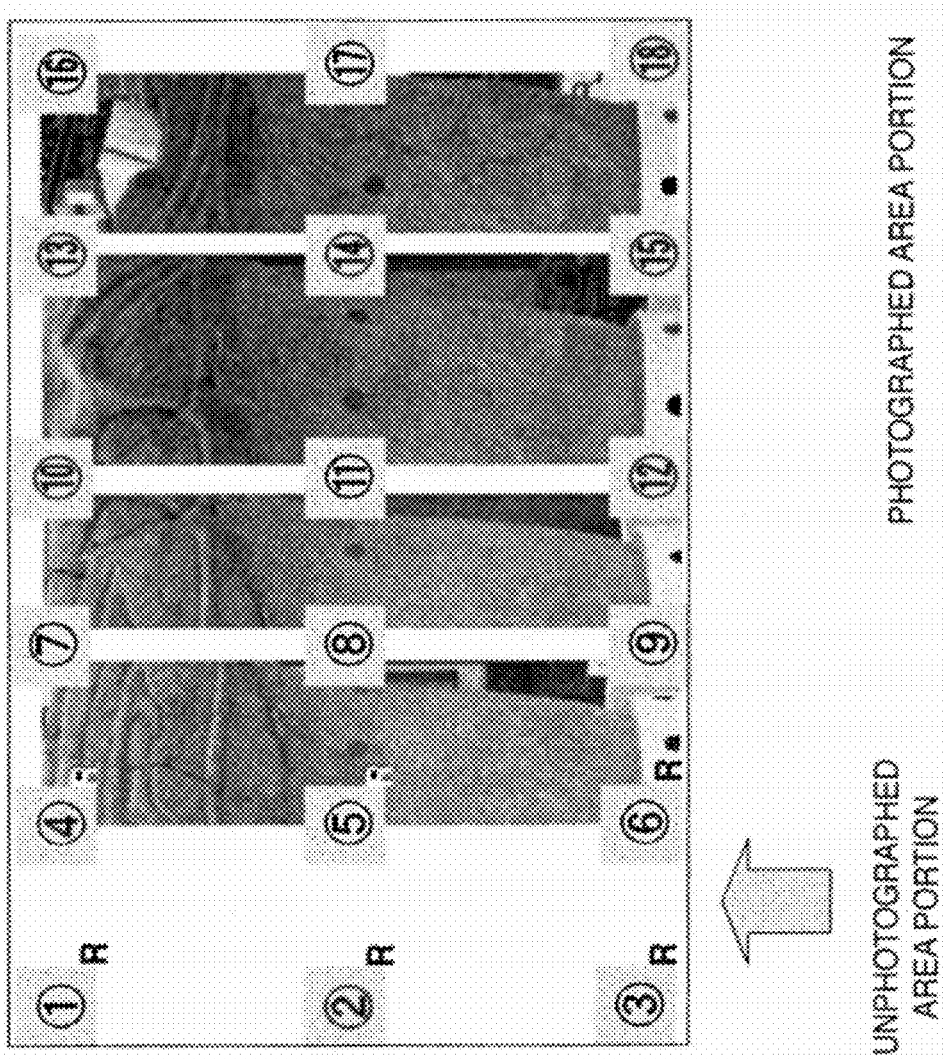
FIG. 12 illustrates an indication example of the two-dimensional photographing range image with the photographed images affixed thereto.

FIG. 12 shows an indication example of the two-dimensional photographing range image with photographed images affixed thereto. The mark symbols (1 in a circle to 18 in a circle) corresponding to the positions of the marks are provided. The mark symbols are indicated in colors. Red (provided with R) indicates the once photographing marks. Black (provided with no character) indicates overlap photographing marks. The area surrounded by the mark symbols (1 in a circle to 6 in a circle) is kept empty and is an unphotographed area. The areas surrounded by the mark symbols (4 in a circle to 6 in a circle) through (16 in a circle to 18 in a circle) have the photographed images affixed thereto and are already-photographed areas. The photographed images affixed to the photographing range image are right-side half portions of the photographed images that are photographed with the left three marks being centerlines in the respective areas.

Figure 13:
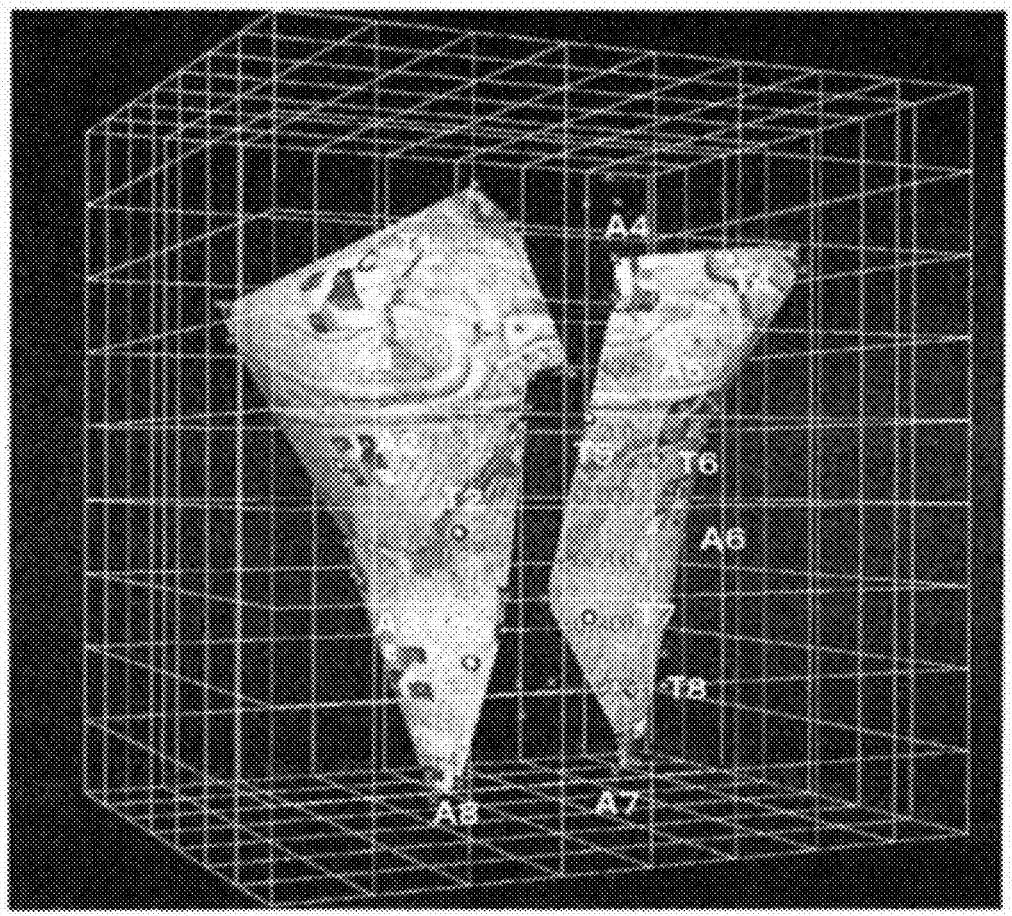
FIG. 13 illustrates an indication example of the three-dimensional photographing range image with the photographed images affixed thereto.

FIG. 13 shows an indication example of the three-dimensional photographing range image with photographed images affixed thereto. The positions of the retro target parts of the color-coded targets are indicated with squares (□) in the coordinate space of a perspective view. The mark symbols (A1 to A8) corresponding to the color-coded targets are indicated. Each of the color-coded targets has the three squares (□) indicating the positions of the retro target parts. Further, the positions of the retro targets as separate units are indicated with circles (○), and the mark symbols (T1 to T8) corresponding to the retro targets as separate units are indicated. The already-photographed areas have the photographed images affixed thereto. The unphotographed areas have no photographed images and indicated as vacant spaces.

Returning to FIG. 1, the control section 10 has a control program in an internal memory to control the image photographing device 1 for three-dimensional measurement and each section thereof, controls flows of signals and data, and execute the function of the image photographing device for three-dimensional measurement. Particularly, the control section 10 enables: the mark extraction section 71 to extract the marks from the photographed images, the code identification section 72 to identify the identification codes of the extracted marks, the photographed area defining section 81 to define the area of the measuring object 2 in the photographed image, the mark photographing time number counting section 82 to count the number of photographing times of each of the marks, the area photographing time number counting section 83 to count the number of photographing times of each of the photographed areas, the mark grouping section 83 to group the marks into at least two groups in response to the number of photographing times, the photographed area grouping section 84 to group the photographed areas into at least two groups in response to the number of photographing times, the photographing range image formation section 86 to connect the positions of the marks input in the photographing range image such that the mark symbols of the marks surrounding each of the photographed areas correspond to each other and thereby to match the photographed areas to the photographing range image, and the display section 4 to indicate the marks and/or the photographed areas in at least two groups in the photographing range image.

Further, the character extraction section 7, the image processing section 8, and the control section 10 are implemented in the PC 15.

[Process Flow]

Figure 14B:
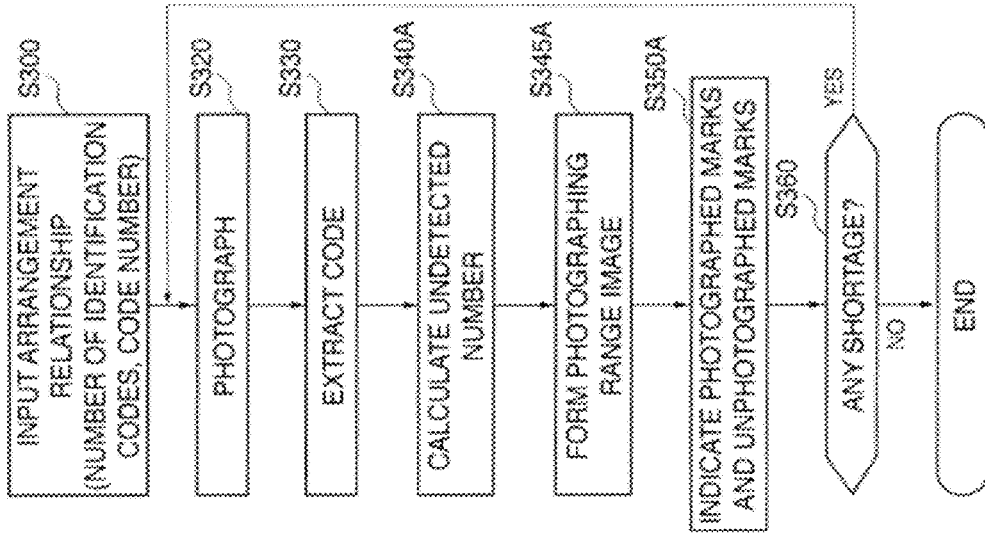
FIG. 14B illustrates another example of process flow of image photographing process.
Figure 14A:
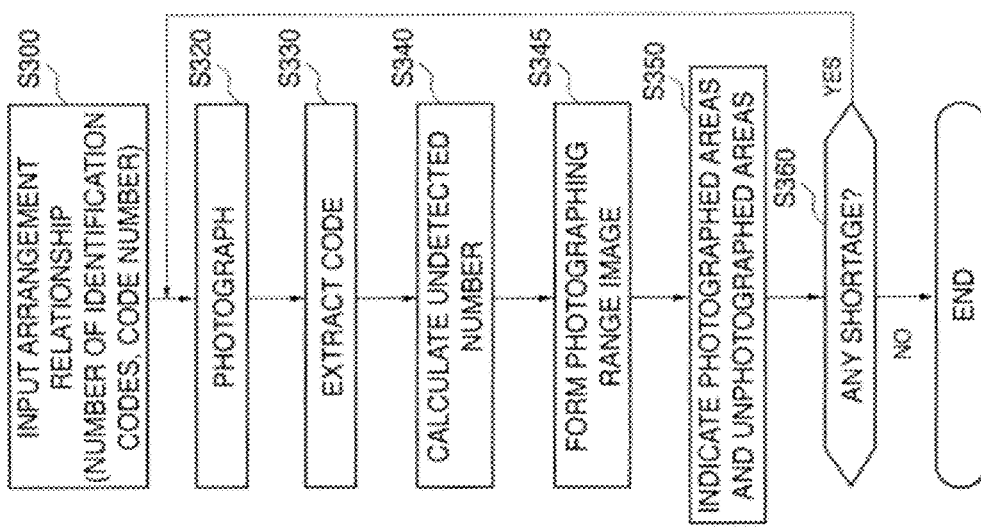
FIG. 14A illustrates an example of process flow of image photographing process.

FIGS. 14A and 14B show examples of process flows of image photographing. FIG. 14A illustrates an example where photographed areas are indicated in groups.

First, the arrangements of marks are input (mark data inputting step: S300). The number of the self-other identifiable codes and code numbers are input as the predetermined condition, thereby enabling identification of the photographed identification codes. When the mark can be identified, the three-dimensional position of the mark is measurable as described later in fourth and fifth embodiments. Accordingly, the measured position coordinates are input in the coordinates of the photographing range image, and it is not necessary to previously designate the mark positions. However, in this embodiment, the example is described where no three-dimensional measurement is conducted. Accordingly, the mark positions to be input in the coordinates of the photographing range image are previously designated. It is not always required that the designated coordinates accurately correspond to the affixed mark positions. It is because subsequently the accurate coordinates can be obtained by texture-mapping and three-dimensional position measurement. Here, marks are affixed to previously designated places on the measuring object 2, and the number of the self-other identifiable identification codes, the code numbers, and the positions of the affixed marks are input while being correlated with mark symbols. Previously designated position coordinates are input as the mark positions. The marks having the self-other identifiable codes, here color-coded targets, are used as the marks.

Next, the measuring object 2 with the marks affixed thereto is photographed by the photographing section 3 (photographing step: S320). The codes of the marks are then extracted (S330). In other words, the marks are extracted from the photographed images by the mark extraction section 71 (mark extraction step). The identification codes of the marks are identified by the code identification section 72, and the identification codes are correlated with the mark symbols provided to the marks (code identification step). The non-overlap photographed areas are next extracted (S340). In other words, the area of the measuring object 2 in the photographed images are divided into the photographed areas formed with the areas each of which is surrounded by at least three marks (the area includes the marks) by the photographed area defining section 81, and the photographed area number is provided to each of the photographed areas (photographed area defining step). Subsequently, the area photographing time number counting section 83 counts the number of photographing times of each of the photographed areas in different photographed images (area photographing time number counting step). For example, the case that all the marks surrounding each of the photographed areas are photographed is regarded as a case that the photographed area has been photographed and thereby is counted into the number of photographing times. Further, the counted number of photographing times of each of the photographed areas is stored in the area photographing time number storage section 53 while being correlated with the mark symbols of the marks surrounding the photographed area (area photographing time number storage step).

Then, the photographed area grouping section 85 groups the photographed areas into at least two groups in response to the number of photographing times of each of the photographed areas (photographed area grouping step). Accordingly, for example, the photographed areas in which non-overlap photographing is conducted and overlap photographing is conducted are grouped into different groups, thereby enabling extraction of the non-overlap photographed areas. Further, determinations are made whether the input number of the identification codes and the code numbers are all photographed, thereby enabling determination about presence of the non-overlap photographed area.

Next, the photographing range image is formed (S345). In other words, the photographing range image forming section 86 connects the positions of the marks input in the photographing range image such that the mark symbols of the marks surrounding each of the photographed areas correspond to each other, thereby matching the photographed areas to the photographing range image to form a photographing range image (photographing range image formation step). The marks input in the photographing range image are given determined mark symbols and positions. The marks surrounding the photographed areas are given specified mark symbols. Accordingly, the position coordinates of the at least three marks surrounding each of the photographed areas are connected in the photographing range image so that the mark symbols correspond to each other, and the photographed areas can be thereby matched into the photographing range image. The photographed areas are matched into all the defined photographed areas (except for invisible portions) in the area of the measuring object 2, thereby enabling formation of the photographing range image with the area of the measuring object 2 in the photographed range image divided into the photographed areas. Further, the image of each of the photographed areas is extracted from the photographed images and stored in the photographed area portion storage section 54. The image of each of the photographed areas is extracted from the photographing area portion storage section 54 by the photographed range image formation section 86. The image of each of the photographed areas is expanded or contracted and then affixed to the photographing range image such that the at least three marks surrounding each of the photographed areas correspond to the positions of the marks input in the photographing range image. Accordingly, the photographing range image with the photographed images affixed to the photographed areas are formed, thus providing more realistic sensation. As described above, not only indicating outlines of the photographed areas in the photographing range image, actually photographed images can be contained in the photographing range image. Then, the display section 4 indicates the photographed areas defined in the photographing range image in at least two groups (display step: S350). For example, the photographed areas are grouped into the overlap photographed areas and the non-overlap photographed areas in the indication. The control section 10 next determines whether or not the non-overlap photographed area is present (S360). If it is present (Yes in S360), the process returns to the photographing step (S320) and repeats operations from photographing to indication. If it is not present (No in S360), the photographing process ends. Although mark grouping will be described later, it is matter of course that the grouped marks may be indicated in the photographing range image.

FIG. 14B illustrates an example where marks are indicated in groups.

The mark data inputting step (S300) to the code identification step are the same as the example of FIG. 14A. Non-overlap marks are next extracted (S340A). In other words, the mark photographing time number counting section 82 counts the number of photographing times of each of the marks in different photographed images (mark photographing time number counting step). Further, the counted number of photographing times of each of the marks is stored in the mark photographing time number storage section 52 while being correlated with the mark symbol (mark photographing time number storage step). The mark grouping section 84 groups the marks into at least two groups in response to the number of photographing times of each of the marks (mark grouping step). Accordingly, for example, the marks for which non-overlap photographing is conducted and overlap photographing is conducted are grouped into different groups, thereby enabling extraction of the non-overlap marks. The photographing range image is formed on the basis of the positions of the marks having the self-other identifiable codes in the photographed images (S345A). Although it is also possible to use coordinates obtained from a three-dimensional measurement as the mark positions, previously designated mark positions are input in this embodiment. In other words, the input mark positions are mapped in the photographing range image. Then, the display section 4 provides the mark symbols to the mark positions in the photographing range image and indicates the marks in at least two groups (display step: S350A). For example, the marks are grouped into the overlap photographing marks and non-overlap photographed marks in the indication. The subsequent determination about whether or not the non-overlap photographing mark is present and a repeating loop of steps are the same as the example of FIG. 14A. In the photographing range image described here, at least the positions of the marks having the self-other identifiable codes are indicated. Further, actually photographed images and outlines of the photographed areas included in the photographing range may be added to the photographing range image.

According to this embodiment, the image photographing device for three-dimensional measurement can be provided that enables efficient photographing with just sufficient images in a case that a photographer uses a single camera to photograph while moving. In other words, since the number of photographing times for each photographed area is expressed, the measuring object can be efficiently photographed with just sufficient images. Further, since the marks having the self-other identifiable identification codes are used, the image photographing device has an advantage in automatization of image processing such as connection of the photographed images, the three-dimensional measurement of the mark data, and formation of the texture images.

Second Embodiment

In the first embodiment, it is described that both the marks and photographed areas are grouped based on the number of photographing times. However, in this embodiment, it will be described that the photographed areas are grouped based on the number of photographing times.

The device may have changes in its configuration in the storage section 5 and image processing section 8. It can be regarded that the function of the mark photographing time number storage section 52 is included in the area photographing time number storage section 53 and the function of the mark photographing time number counting section 82 is included in the area photographing time number counting section 83. The mark photographing time number storage section 52 and the mark photographing time number counting section 82 can be omitted. Since the photographed area grouping section 85 groups photographed areas, the mark grouping section 84 can be also omitted. As shown in FIG. 14A, the process flow of image photographing is carried out. Even in this case, a photographing range image with grouped photographed areas as in FIG. 11 can be displayed.

Since overlap photographed areas, non-overlap photographed areas, and so forth can be visually indicated, the image photographing device for three-dimensional measurement can be provided that enables efficient photographing with just sufficient images in a case that a photographer uses a single camera to photograph while moving, similarly to the first embodiment.

Third Embodiment

In the first embodiment, it is described that both the marks and photographed areas are grouped based on the number of photographing times. However, in this embodiment, it will be described that the marks are grouped based on the number of photographing times.

The device may have changes in its configuration in the storage section 5 and the image processing section 8. The photographing device has the photographed image storage section 51, the mark photographing time number storage section 52, the mark photographing time number counting section 82, and the mark grouping section 84, and does not have to conduct definition of photographed areas. Accordingly, the area photographing time number storage section 53, the photographed area portion storage section 54, the photographed area defining section 81, the area photographing time number counting section 83, the photographed area grouping section 85, and the photographing range image formation section 86 can be omitted. As shown in FIG. 14B, the process flow of image photographing is carried out. In this case also, a photographing range image with grouped marks as in FIG. 10 can be displayed.

Since overlap photographed areas, non-overlap photographed areas, and so forth about marks can be visually indicated, the image photographing device for three-dimensional measurement can be provided that enables efficient photographing with just sufficient images in a case that a photographer uses a single camera to photograph while moving, similarly to the first embodiment.

Fourth Embodiment

In the first embodiment, it is described that the number of the self-other identifiable identification codes and the code numbers are input and the mark positions input in the photographing range image are previously designated. However, in this embodiment it will be described that the photographing device has a three-dimensional position measurement section and the mark positions input in the photographing range image are three-dimensional coordinates obtained by the three-dimensional position measurement section. In this case, the mark data inputting section 61 automatically inputs the obtained three-dimensional position coordinates in the photographing range image. Although the three-dimensional measurement can be achieved only about the marks, the larger number of characteristic points allows position measurement with higher accuracy. Accordingly, an example will be described where characteristic points (including marks) extracted by the mark extraction section 71 are used.

Figure 15:
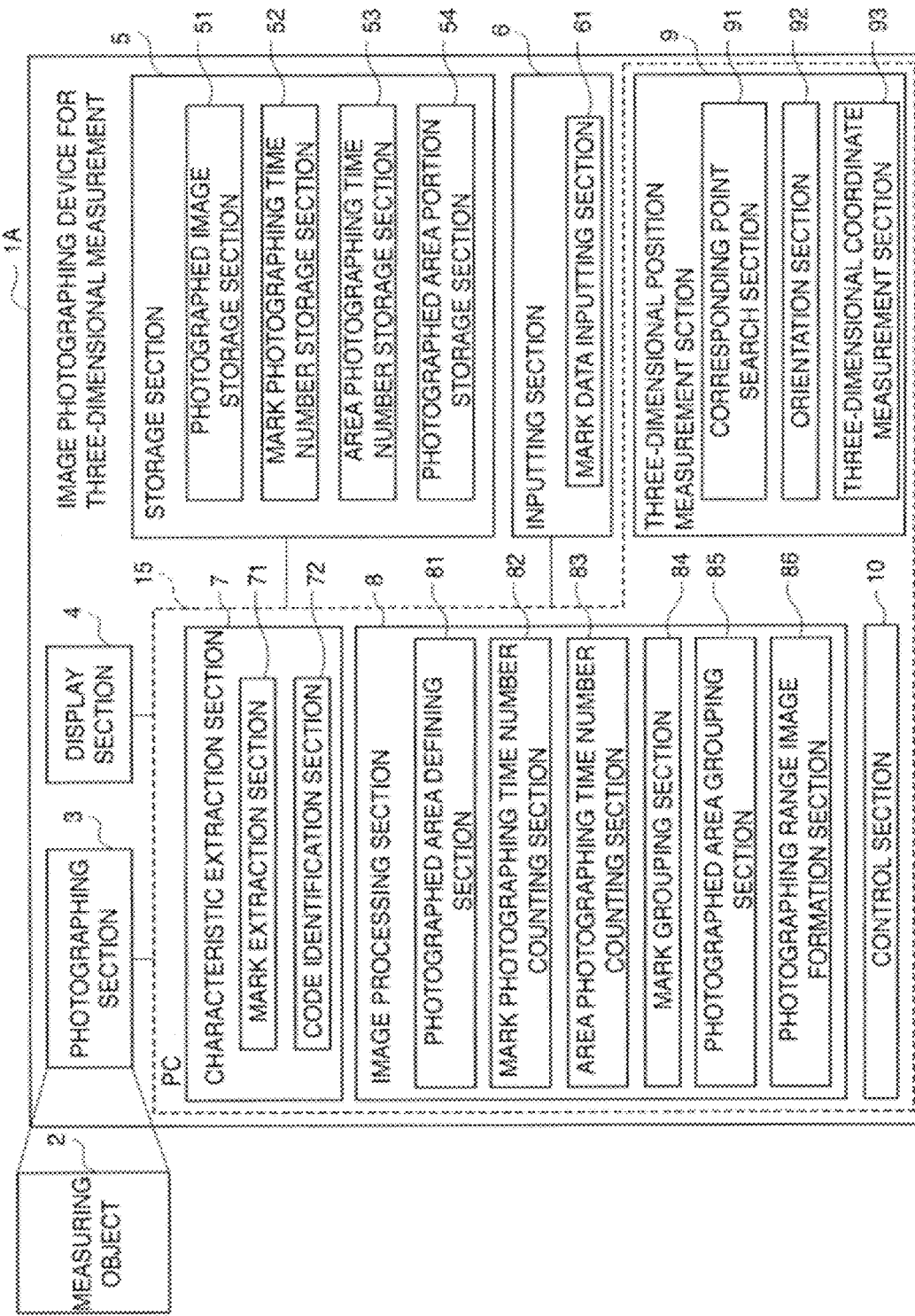
FIG. 15 is a block diagram, illustrating an example of a structure of an image photographing device for three-dimensional measurement in accordance with a fourth embodiment.

FIG. 15 is a block diagram showing an example of a structure of an image photographing device 1A for three-dimensional measurement according to this embodiment. A three-dimensional position measurement section 9 is added to the configuration of the first embodiment and is used for image photographing process. The three-dimensional position measurement section 9 obtains the three-dimensional position coordinates of characteristic points including marks on the measuring object 2 based on the positions on a screen of characteristic points in the photographed images that include marks extracted by the mark extraction section 71. The mark extraction section 71 extracts the characteristic points including the marks from the photographed images. The three-dimensional position measurement section 9 has a corresponding point search section 91 for obtaining corresponding points of the characteristic points extracted by the mark extraction section 71 in a stereo image, an orientation section 92 for conducting orientation determination to obtain the tilt of the camera in the photographing section 3 based on the corresponding points obtained by the corresponding points search section 91, and a three-dimensional coordinate measurement section 93 for obtaining the three-dimensional position coordinates of the characteristic points by use of camera positions obtained by the orientation section 92. The mark data inputting section 61 obtains the position coordinates of the characteristic points including the marks that have been obtained by the three-dimensional measurement and automatically inputs the position coordinates in the photographing range image.

In the three-dimensional measurement, the characteristic points of overlapping portions in at least two images are used to obtain the characteristic points of the measuring object 2 by relative orientation. First, a stereo image is formed with two photographed images (one as a reference image and the other as a search image). The corresponding point search section 91 correlates the characteristic points (corresponding points are searched). The corresponding points are searched by cross-correlation processing.

[Cross-Correlation Processing]
Cross-Correlation Factor Method $$C(a, b) = \sum_{m_1=0}^{N_1-1} \sum_{n_1=0}^{N_1-1} \frac{\{I_{(a,b)}(m_1, n_1) - \bar{I}\}\{T(m_1, n_1) - \bar{T}\}}{\sqrt{I_{\sigma_{ab}} T_\sigma}}$$

where, $$\bar{I} = \frac{1}{N_1^2} \sum_{m_1=0}^{N_1-1} \sum_{n_1=0}^{N_1-1} I_{(a,b)}(m_1, n_1)$$

$$\bar{T} = \frac{1}{N_1^2} \sum_{m_1=0}^{N_1-1} \sum_{n_1=0}^{N_1-1} T(m_1, n_1)$$

$$I_{\sigma_{ab}} = \frac{1}{N_1^2} \sum_{m_1=0}^{N_1-1} \sum_{n_1=0}^{N_1-1} \{I_{(a,b)}(m_1, n_1) - \bar{I}\}^2$$

$$T_\sigma = \frac{1}{N_1^2} \sum_{m_1=0}^{N_1-1} \sum_{n_1=0}^{N_1-1} \{T(m_1, n_1) - \bar{T}\}^2$$

Figure 16:
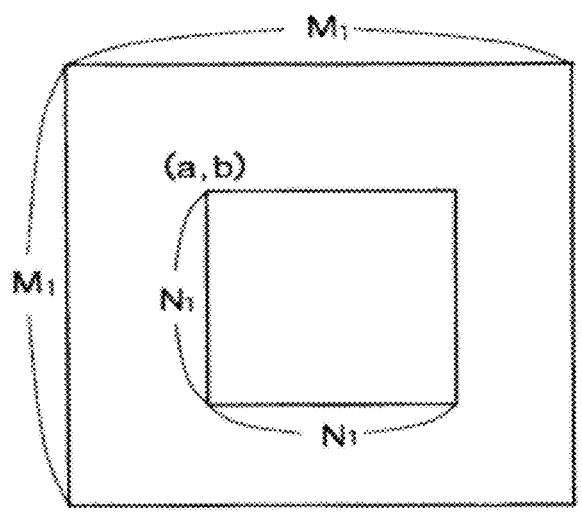
FIG. 16 is a diagram, explaining a search for a corresponding point.

$I_{(a,b)}(m_1, n_1)$: Partial image of an input image $T(m_1, n_1)$: Template image FIG. 16 is a diagram for explaining a search for corresponding point. As shown in FIG. 16, a template image of $N_1 \times N_1$ pixels is moved in a search range $(M_1-N_1+1)^2$ in an input image of $M_1 \times M_1$ pixels larger than the template image. When a left high position in the template image with the largest C(a, b) of the above formula is obtained, it is regarded that the corresponding points are searched with respect to the template image. In a case of dealing with left and right images, for example, a template image of $N_1 \times N_1$ pixels is set in the left image, a search area of $M_1 \times M_1$ pixels is set in the right image, and these operations are conducted for positions on each of the images.

Here, the example of the corresponding point search using normalized cross-correlation processing is described. However, the other methods such as sequential similarity detection algorithm (SSDA) may be used.

[Calculation of Exterior Orientation Parameter: Relative Orientation]

Next, photographing positions of the photographing section 3 and the three-dimensional coordinates of characteristic points are obtained based on the corresponding points between the left and right images. First, a method for obtaining the position and tilt of the camera by relative orientation will be described. Relative orientation is performed by the orientation section 92.

A model image is a stereoscopic image obtained when an object is reconstructed into the state at the point of photographing based on at least two stereoscopic photographs. Formation of a relatively oriented similar model image is referred to as "relative orientation." That is, relative orientation is determination of the positions of projection centers and tilts of left and right cameras respectively such that two corresponding beams of a stereoscopic photograph intersect with each other.

Figure 17:
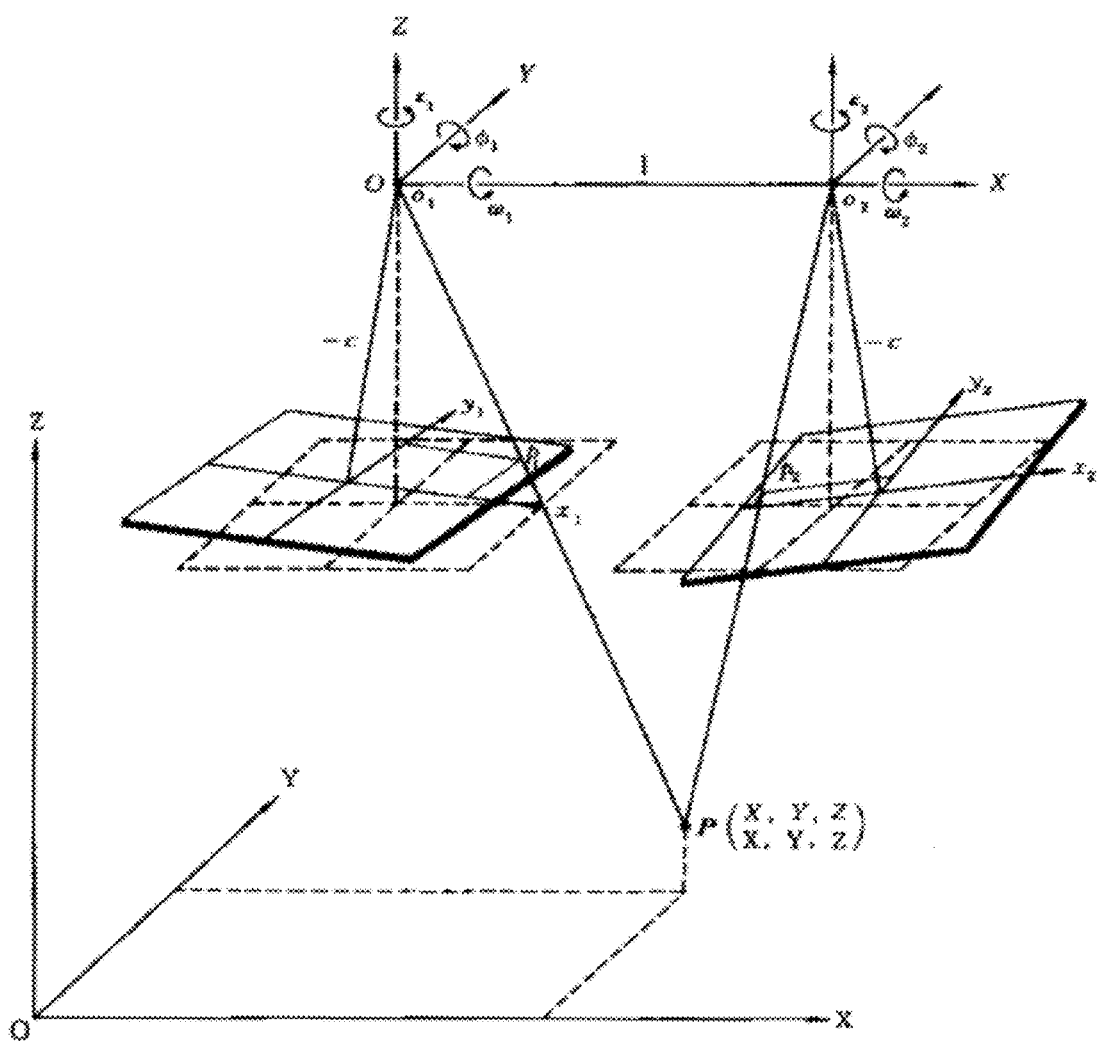
FIG. 17 is a diagram, explaining relative orientation.

FIG. 17 is an explanatory diagram of the orientation determination. Here, the orientation calculation of each model image will be described in detail. The position (3D coordinates and posture (inclination of each of 3 axes)) of each of the right and left cameras are obtained through the calculation.

The parameters related to the position of each of the cameras are obtained from the coplanarity condition equation below:

$$\begin{vmatrix} X_{01} & Y_{01} & Z_{01} & 1 \\ X_{02} & Y_{02} & Z_{02} & 1 \\ X_1 & Y_1 & Z_1 & 1 \\ X_2 & Y_2 & Z_2 & 1 \end{vmatrix} = 0 \quad (3)$$

$X_{01}, Y_{01}, Z_{01}$: projection center coordinates of left image $X_{02}, Y_{02}, Z_{02}$: projection center coordinates of right image $X_1, Y_1, Z_1$: image coordinates of left image $X_2, Y_2, Z_2$: image coordinates of right image The origin of the model image coordinate system is defined as the left projection center, and the line connecting it and the right projection center is defined as the X-axis. The baseline length is defined as the unit length of the reduction scale. The parameters to be obtained here are five rotational angles, namely Z-axis rotational angle κ1 and Y-axis rotational angle φ1 of the left camera, and Z-axis rotational angle κ2, Y-axis rotational angle φ2 and X-axis rotational angle ω2 of the right camera. Here, X-axis rotational angle ω1 of the left camera is 0 (zero) and does not have to be taken into consideration.

Under the above conditions, the coplanarity condition equation (3) can be transformed into the equation (4), and the respective parameters can be obtained by solving the equation (4):

$$F(\kappa_1, \phi_1, \kappa_2, \phi_2, \omega_2) = \begin{vmatrix} Y_1 & Z_1 \\ Y_2 & Z_2 \end{vmatrix} = Y_1 Z_2 - Y_2 Z_1 = 0 \quad (4)$$

Here, such coordinate transformation relations (5) and (6) as given below hold between the model coordinate system XYZ and the camera coordinate system xyz:

$$\begin{pmatrix} X_1 \\ Y_1 \\ Z_1 \end{pmatrix} = \begin{pmatrix} \cos\phi_1 & 0 & \sin\phi_1 \\ 0 & 1 & 0 \\ -\sin\phi_1 & 0 & \cos\phi_1 \end{pmatrix} \begin{pmatrix} \cos\kappa_1 & -\sin\kappa_1 & 0 \\ \sin\kappa_1 & \cos\kappa_1 & 0 \\ 0 & 0 & 1 \end{pmatrix} \begin{pmatrix} x_1 \\ y_1 \\ -c \end{pmatrix} \quad (5)$$

-continued $$\begin{pmatrix} X_2 \\ Y_2 \\ Z_2 \end{pmatrix} = \begin{pmatrix} 1 & 0 & 0 \\ 0 & \cos\omega_2 & -\sin\omega_2 \\ 0 & \sin\omega_2 & \cos\omega_2 \end{pmatrix} \qquad (6)$$

$$\begin{pmatrix} \cos\phi_2 & 0 & \sin\phi_2 \\ 0 & 1 & 0 \\ -\sin\phi_2 & 0 & \cos\phi_2 \end{pmatrix} \begin{pmatrix} \cos\kappa_2 & -\sin\kappa_2 & 0 \\ \sin\kappa_2 & \cos\kappa_2 & 0 \\ 0 & 0 & 1 \end{pmatrix} \begin{pmatrix} x_2 \\ y_2 \\ -c \end{pmatrix} + \begin{pmatrix} 1 \\ 0 \\ 0 \end{pmatrix}$$

Using these equations, unknown parameters are calculated by the following procedures:
(a) Initial approximate values of the unknown parameters are normally 0.
(b) A derivative coefficient obtained when the coplanarity condition equation (4) is linearized, or Taylor-expanded, around the approximation is obtained from the equations (5) and (6), to formulate an observation equation.
(c) A least squares method is applied to calculate correction amounts for the approximate values.
(d) The approximate values are corrected.
(e) Using the corrected approximate values, the operations (b) to (e) are repeated until a convergence is achieved.

The position and inclination of the camera are determined when the unknown parameters ($\kappa_1$, $\phi_1$, $\kappa_2$, $\phi_2$, $\omega_2$) are obtained.

The 3D coordinates in the objective space can be determined through the stereo-method when the position of camera is determined through the relative orientation method.

[Stereo Method]

Figure 18:
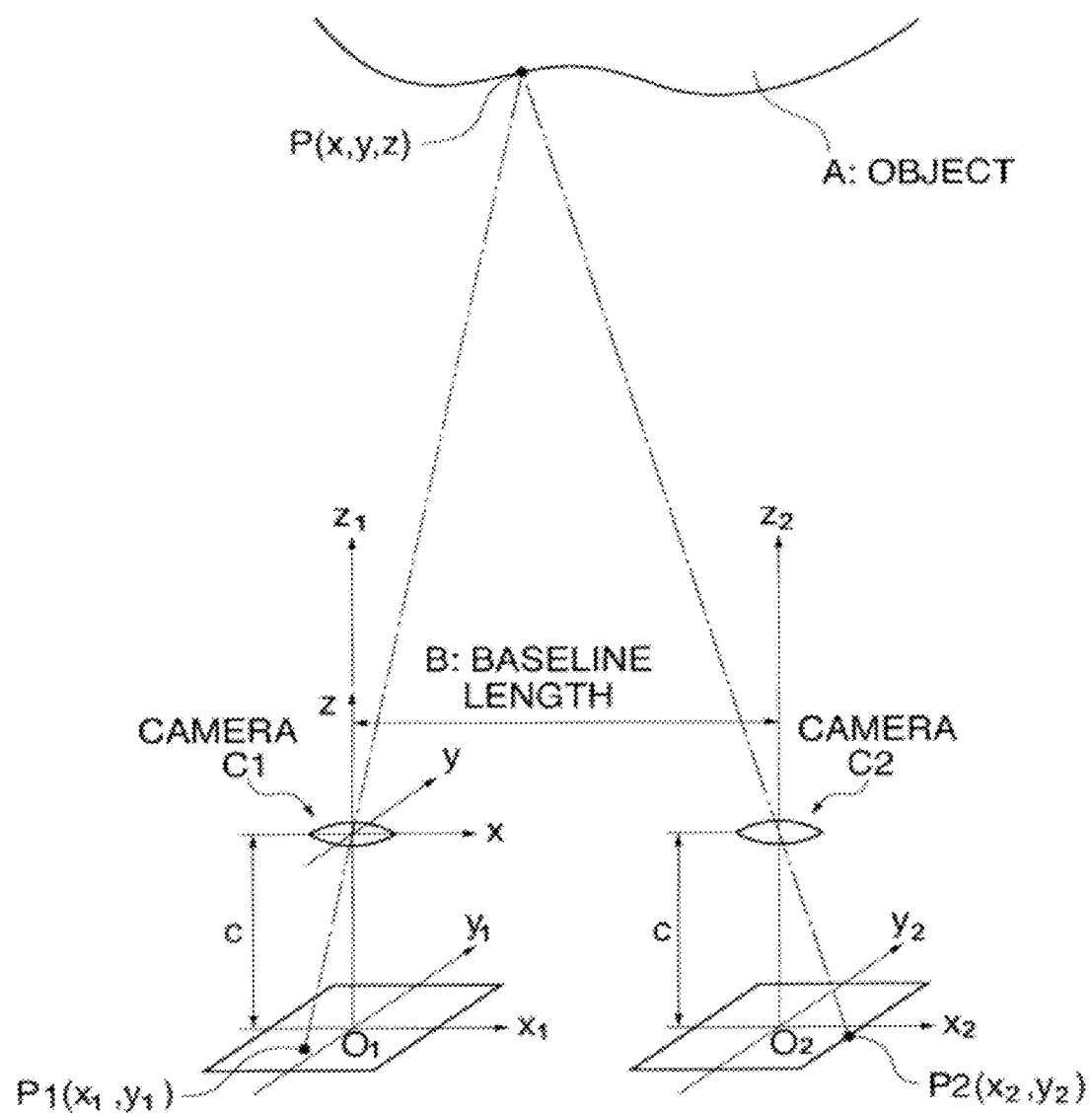
FIG. 18 is a diagram, explaining a stereo method.

FIG. 18 is a diagram for explaining a stereo method. For simplicity, it is assumed that two cameras C1 and C2 of the same specifications are used. The optical axes of the cameras C1 and C2 are parallel to each other, the distances "c" from the principal point of the camera lens to the CCD surface are the same, and the CCD surface is assumed to be disposed perpendicular to the optical axes. The distance between the two optical axes (baseline length) is represented as "B".

The coordinates of a point P1 ($x_1$, $y_1$) and a point P2 ($x_2$, $y_2$) on the photographing screens (CCD surfaces) of cameras C1 and C2 and a point P (x, y, z) on the object have the following relationship.

$$x_1 = cx/z \qquad (7)$$

$$y_1 = y_2 = cy/z \qquad (8)$$

$$x_2 - x_1 = cB/z \qquad (9)$$

Note that the origin of the entire coordinate system (x, y, z) is assumed to locate at the principal point of the lens of the camera C1.

"z" can be obtained from the equation (9), and "x" and "y" can then be obtained using the "z" from the equations (7) and (8).

When the obtained position coordinates of the marks can be mapped in a three-dimensional photographing range image, the mapped marks are connected with lines, and photographed areas can be matched into the photographing range image, thereby, as shown in FIG. 11, allowing formation of a photographing range image. The image of each of the photographed areas are affixed to the photographing range image, thereby, as shown in FIG. 13, allowing a visual image.

When the three-dimensional coordinate of each of the characteristic points are obtained, three-dimensional model image, ortho image, and panoramic image can be formed. When the characteristic points are placed in a three-dimensional photographing range image space based on the obtained three-dimensional coordinates, a three-dimensional model image can be constructed. Orthogonal projection on a plan view provides an ortho image. Central projection on a plane combined with projection of each model image thereto provides a panoramic image. The accuracy of photographing range image can be improved by use of three-dimensional coordinates. The overlap photographed areas and the non-overlap photographed areas can be visually distinguished in the photographed areas, thus improving efficiency of photographing.

Fifth Embodiment

In the fourth embodiment, it is described that the mark positions input in the photographing range image are the position coordinates obtained by the three-dimensional position measurement section 9. However, in this embodiment, it is described that three-dimensional coordinates are obtained based on photographed images. In this case also, the mark data inputting section 61 automatically inputs the obtained three-dimensional position coordinates in the photographing range image.

[Texture-Mapping]

The mark data inputting section 61 can use three-dimensional coordinates obtained by texture-mapping as the mark positions to be input in the photographing range image. In such a manner, the accuracy of the photographing range image can be improved. Next, a method for texture-mapping photographed images on a model image formed in a space coordinates (X, Y, Z) will be described. The space coordinate of each pixel on the image are calculated. In this process, an image coordinate (x, y) on a photograph is converted into a space coordinate (X, Y, Z). The space coordinate (X, Y, Z) has values calculated by a three-dimensional measurement. The space coordinate (X, Y, Z) corresponding to the image coordinate (x, y) on the photograph can be given by the following formula. In this way, the position for obtaining the intensity of each pixel on the image can be obtained for mapping the image in the three-dimensional space.

$$X = X_0 + x\Delta X$$

$$Y = Y_0 - y\Delta Y$$

$$Z = -\frac{aX + bY + d}{c}$$

Where,
($X_0$, $Y_0$): left high position in a photographed image in the space coordinate system,
($\Delta X$, $\Delta Y$): a size of a single pixel in the space coordinate system,
(x, y): an image coordinate of a photographed image,
(X, Y, Z): a space image coordinate, and
a, b, c, d: coefficients of a plane equation formed by a plurality of reference points to which a certain image coordinate (x, y) is interpolated.

These coefficients are, for example, coefficients of a plane equation in Triangulated Irregular Network (TIN). TIN is a method for interpolating a three-dimensional coordinate to generate a mesh having triangles as its structural unit and is also referred to as "triangular mesh". (For details about TIN, see "*Computational Geometry and Geographic Information Processing*," pp 127 by Masao Iri and Takeshi Koshizuka; Voronoi Diagrams in "*A survey of a Fundamental Geometric*

Data Structure," pp. 345-405, *ACM Computing Surveys*, Vol. 23, authored by Franz Aurenhammer, translated by Atsukichi Sugihara; and so forth.)

When the marks in the photographed images can be mapped in the three-dimensional photographing range image, the photographing range image with the photographed areas matched thereto can be formed. The pixels of each of the photographed areas are affixed to the photographing range image, thereby allowing a visual image as in FIG. 13. Further, an ortho image and a panoramic image can be formed. The overlap photographed areas and the non-overlap photographed areas can be visually distinguished in the photographed areas, thus improving efficiency of photographing.

Sixth Embodiment

In this embodiment, it will be described that a camera photographing range indicating areas photographed by a camera is additionally indicated in a photographing range image. The camera photographing range is formed to indicate the range of any one of the photographed images (referring to as first photographed image). The image processing section has a boundary line formation section (not shown in drawing). The boundary line formation section extracts a plurality of characteristic points in a vicinity of a boundary (periphery) of the first photographed image and plots the characteristic points in the photographed areas including those characteristic points among the photographed areas stored in the photographed area portion storage section 54. The photographed area including those characteristic points is extracted from a second photographed image having the overlap photographed area that overlaps with the first photographed image. It is preferable to select the photographed image in which the photographed area is photographed, as the second photographed image, in a direction as perpendicular as possible. Further, a straight line such that the sum of squares of the distances from the characteristic points to this straight line is the smallest is drawn in the photographed area including those characteristic points as a boundary line. Such boundary lines are drawn in the photographed areas and stored in the photographed area portion storage section 54. When a photographing range image formation section 86 uses the photographed areas to form the photographed images in the photographing range image, it simultaneously inputs the boundary lines, thereby forming the camera photographing range. Since the boundary line is formed based on the characteristic points in the first photographed image, the camera photographed range as a result becomes relatively smaller than an actually photographed range. However, the camera photographing range is sufficient or at the safety side and causes no problem in checking an overlapping condition. Accordingly, the display section 4 can indicate the camera photographing range in the photographing range image. Further, obtainment of the three-dimensional coordinates of the characteristic points allows indication of the camera photographing range with further higher accuracy.

The camera photographing range is indicated as described above, and the photographing range of the actual camera can be therefore grasped, thus facilitating a grasp of the relationship between the photographed area and the photographing range of the camera.

Seventh Embodiment

An example of an image photographing device for three-dimensional measurement according to this embodiment will be described where the display section 4, in addition to the first embodiment, displays a live image 11 and an already-photographed image 12 on the same screen and indicates the number of photographing times of marks in a case of photographing at a present position. The live image means an image of a measuring object 8 photographed by a moving photographer with a video camera, a digital camera, or the like as the photographing section 3 at a present position. Usually, the moving photographer uses the video camera or digital camera to display the measuring object as the live image in a finder, display, or the like as the display section 4. Usually, the live image 11 is overwritten in a temporary memory (not shown in drawing) of the storage section 5, transferred to the display section 4 and displayed. Therefore, the live image cannot be processed in a normal mode. However, for example, a process is possible such that a comparison mode is obtained by a shutter operation, the live image is obtained as a still image, and mark symbols are provided by the image processing section 8. In the comparison mode, the still image undergone the image processing is displayed. If the photographer determines that he/she is ready for photographing in the position of the still image and inputs an "OK" signal by an input key, for example, the still image is stored in the photographed image storage section 51 as the photographed image, and the operation mode is switched to return from the comparison mode to the normal mode. If the photographer inputs a "No" signal with an input key, for example, the still image is deleted, and the operation mode is switched to return from the comparison mode to the normal mode. FIGS. 19 to 23 show displayed images in the comparison mode.

FIG. 19 show an example (first example) in which the already-photographed image 12 and the live image 11 are displayed on the same screen. FIG. 19(*a*) is a display screen before photographing, and FIG. 19(*b*) is the display screen after photographing. Both of them display the already-photographed image on the left side and the live image on the right side. In FIG. 19(*a*), no already-photographed image is displayed, and marks (color-coded targets) are indicated in the live image with the mark symbols (1 to 6 in circles) correlated with them indicated thereon. The mark symbols are indicated in colors in response to their number of photographing times. Red (provided with R) indicates once photographing marks, green (provided with G) indicates twice photographing marks, and blue (provided with B) indicates thrice photographing marks. However, in this embodiment the number of photographing times after photographing at the present position where the live image is obtained are indicated. The mark symbols (1 to 6 in circles) in the live image are all red (provided with R), thus meaning that photographing at this position provides the once photographing mark. When an image is photographed at this position, a live image is obtained as the photographed image, as shown in FIG. 19(*b*), the obtained photographed image is displayed in the already-photographed image. Thereafter, the photographer has moved, and marks with mark symbols (3 to 8 in circles) are indicated in the live image. Further, the mark symbols (3 to 6 in circles) of the marks in the range in which the already-photographed image overlaps with the live image are green (provided with G), thus indicating that photographing at this position provides the twice photographing mark. The mark symbols (1, 2, 7, and 8 in circles) of the other marks are red (provided with R), thus indicating that photographing at this position provides the once photographing mark.

Figure 20:
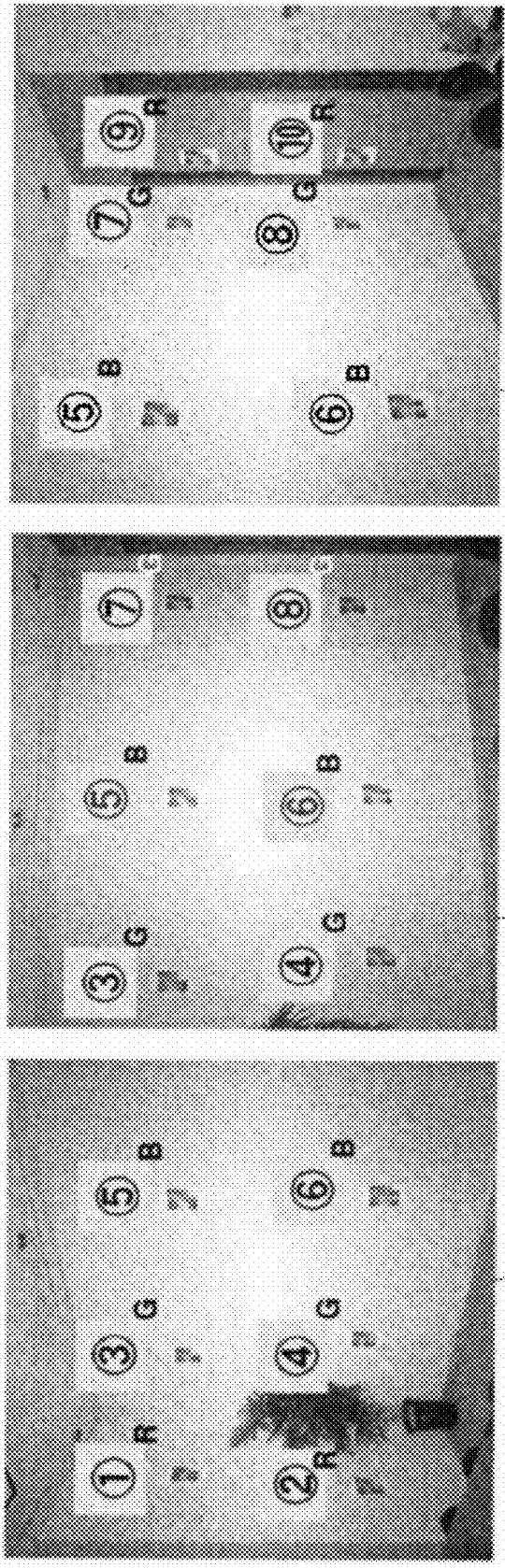
FIG. 20 is a diagram, showing an example (second case) of displaying an already-photographed image and a live image on the same screen.

FIG. 20 shows an example (second example) where the already-photographed image 12 and the live image 11 are displayed on the same screen. When an image is photographed at the position of FIG. 19(*b*), a live image is obtained as the photographed image, as shown in FIG. 20, the obtained photographed image is displayed in the already-photographed image. The already-photographed image of FIG. 19(b) is displayed in the already-photographed image on the left side, and the photographed image obtained from the live image of FIG. 19(b) is displayed as the already-photographed image in the central portion. Thereafter, the photographer has moved, and marks with mark symbols (5 to 10 in circles) are indicated in the live image on the right side. The mark symbols (5 and 6 in circles) of the marks in the range in which the two already-photographed images overlap with the live image are blue (provided with B), thus indicating that photographing at this position provides the thrice photographing mark. Further, the mark symbols (3, 4, 7, and 8 in circles) of the marks in the ranges which overlap between two of the three images are green (provided with G), thus indicating that photographing at this position provides the twice photographing mark. The mark symbols (1, 2, 9, and 10 in circles) of the marks that are present in only one of the three images are red (provided with R), thus indicating that photographing at this position provides the once photographing mark.

Figure 21:
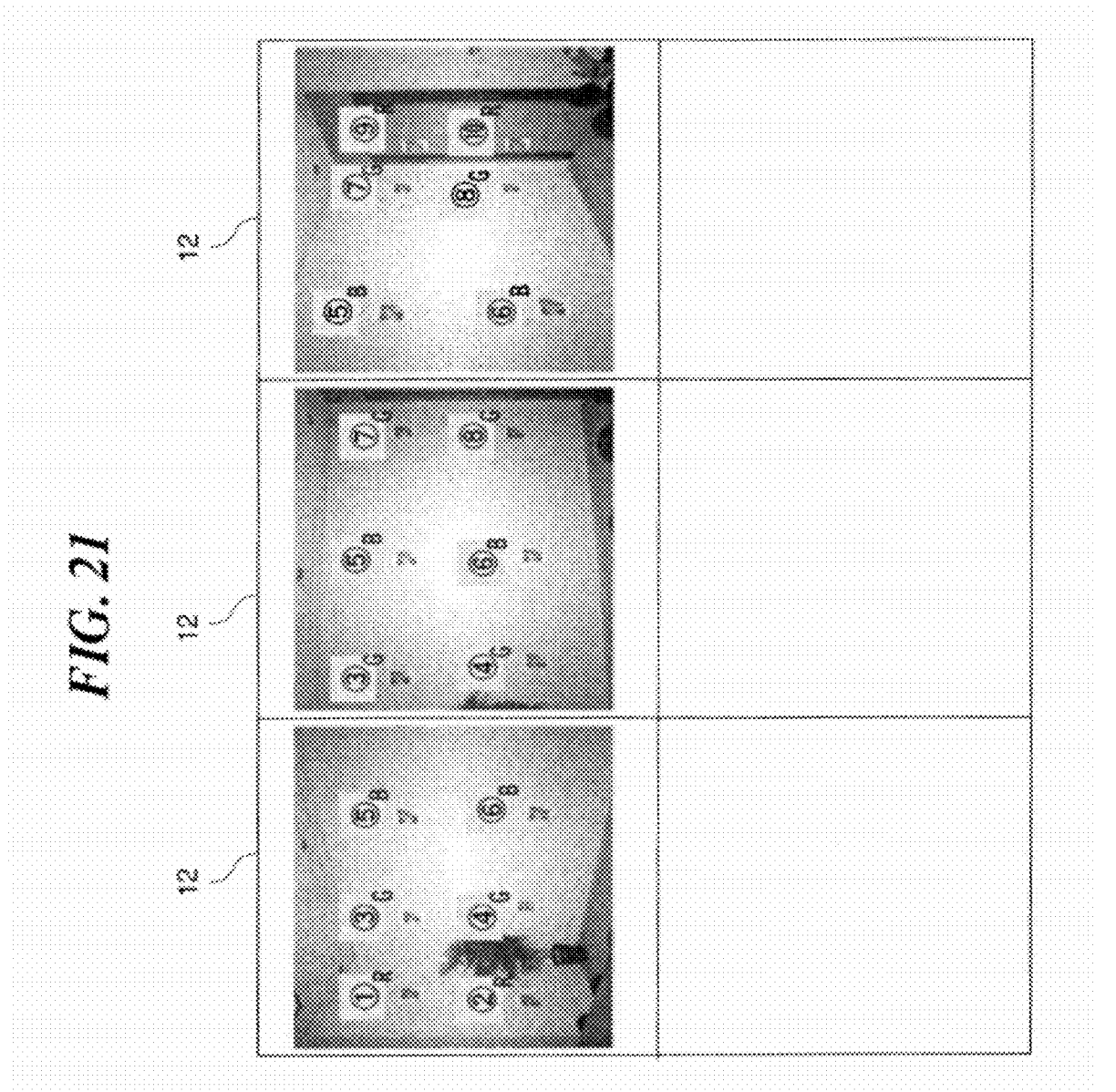
FIG. 21 is a diagram, showing an example (first case) of displaying an already-photographed image.

FIG. 21 shows an example in which the already-photographed image 12 is displayed. This is an example in which an image is photographed at the position in FIG. 20 and the live image is obtained as the photographed image. The already-photographed images on the left side and in the central portion of FIG. 21 are the same as the already-photographed images on the left side and in the central portion of FIG. 20. An already-photographed image on the right side of FIG. 21 is the already-photographed image obtained from the live image of FIG. 20.

FIG. 22 shows an example (third example) where the already-photographed image 12 and the live image 11 are displayed on the same screen. FIG. 22(a) shows a display screen before photographing, and FIG. 22(b) shows the display screen after photographing. Both screens display the already-photographed image on the left side and the live image on the right side. In FIG. 22(a), no already-photographed image is displayed, and marks (color-coded targets) are indicated in the live image with the number of photographing times (1) indicated thereon. The photographing time numbers are indicated in colors. Red (provided with R) corresponds to once photographing, green (provide with G) to twice photographing, and blue (provided with B) to thrice photographing. However, the numbers of photographing times after photographing at the present position where the live image is obtained is indicated in this embodiment. Every number of photographing times indicated in the live image is "1", thus indicating that photographing at this position provides the once photographing mark. When an image is photographed at this position, a live image is obtained as the photographed image, as shown in FIG. 22(b), the obtained photographed image is displayed in the already-photographed image. Then the photographer has moved, another mark arrangement is indicated in the live image. Further, the numbers of photographing times of the marks in the range in which the already-photographed image overlaps with the live image are "2", thus indicating that photographing at this position provides the twice photographing mark. The numbers of photographing times of the other marks are "1", thus indicating that photographing at this position provides the once photographing mark.

Figure 23:
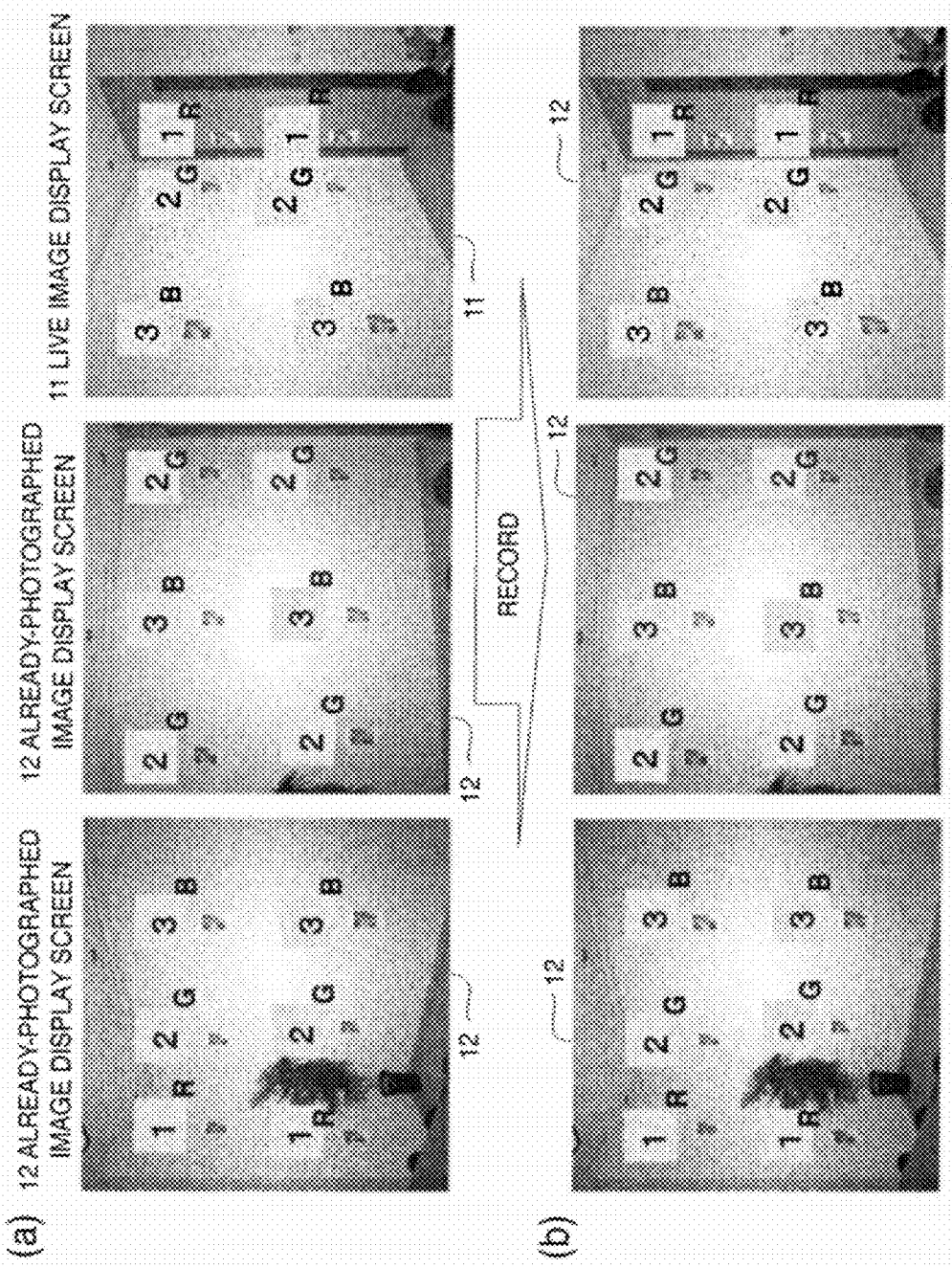
FIG. 23 is a diagram, showing an example (fourth case) of displaying an already-photographed image and a live image on the same screen.

FIG. 23 show an example (fourth example) in which the already-photographed image 12 and the live image 11 are displayed on the same screen. When an image is photographed at the position of FIG. 22(b), a live image is obtained as the photographed image, and, as shown in FIG. 23(a), the obtained photographed image is displayed in the already-photographed image. The already-photographed image of FIG. 22(b) is displayed in the already-photographed image on the left side, and the photographed image obtained from the live image of FIG. 22(b) is displayed as the already-photographed image in the center place. Then the photographer has moved, another mark arrangement is further indicated in the live image on the right side. Further, the number of photographing times of the marks in the range in which the two already-photographed images overlap with the live image is "3," thus indicating that photographing at this position provides the thrice photographing mark. Further, the number of photographing times of the marks in the ranges which overlap between two of the three images is "2," thus indicating that photographing at this position provides the twice photographing mark. Further, the number of photographing times of the marks that are present in only one of the three images is "1," thus indicating that photographing at this position provides the once photographing mark. FIG. 23(b) shows an example in which already-photographed images are displayed. This is an example in which an image is photographed at the position of FIG. 23(a) and the live image is obtained as a photographed image. The already-photographed images on the left side and in the center place of FIG. 23(b) are the same as the already-photographed images on the left side and in the center place of FIG. 23(a), respectively. An already-photographed image on the right side of FIG. 23(b) is the already-photographed image obtained from the live image of FIG. 23(a).

As described above, this embodiment enables image photographing while the live image can be compared with the already-photographed images. Further, the number of photographing times of marks is indicated, thus preferable for prevention of non-overlap images.

Eighth Embodiment

An example will be described in which an image photographing device for three-dimensional measurement according to this embodiment uses a non-coded mark, which itself is not identifiable, as an identifiable mark.

That is, a retro target which itself is not identifiable can be made identifiable using arrangement relationship with mark color-coded targets which are self-other identifiable.

Figure 24:
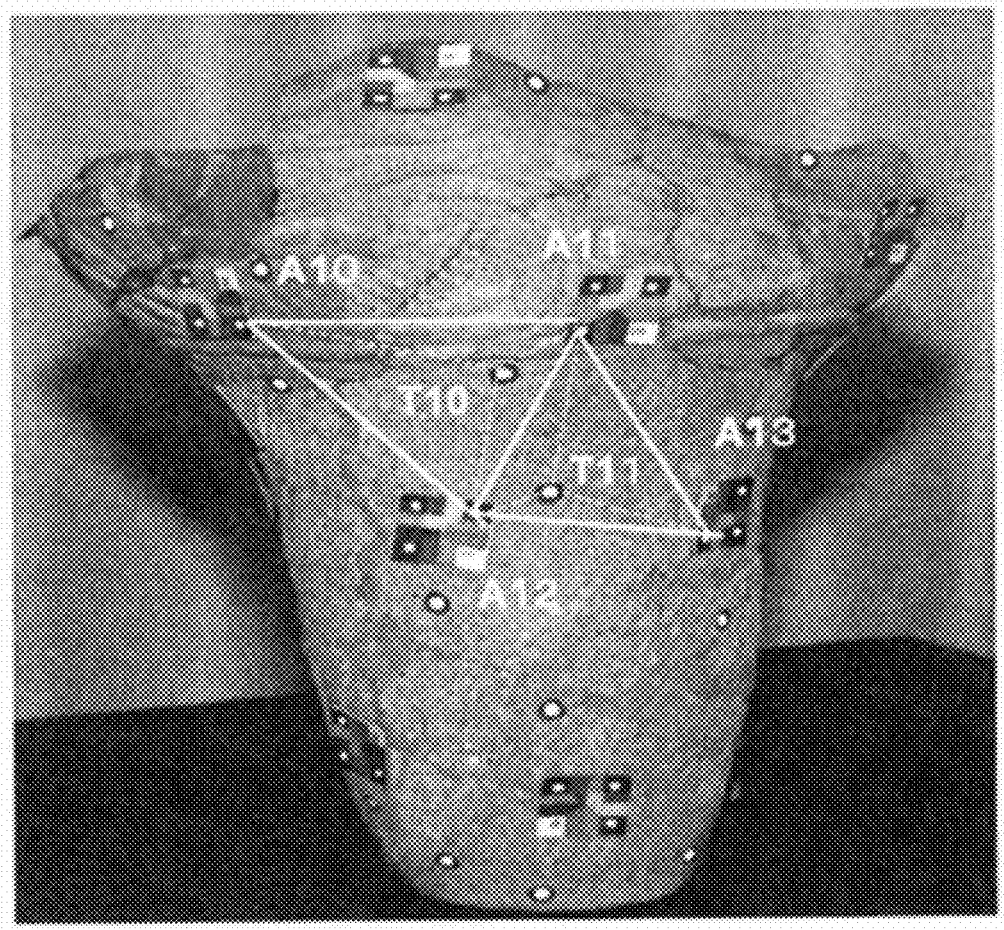
FIG. 24 is a diagram, showing an example where the color-coded targets and the retro targets are together used as identifiable marks.
Figure 25:
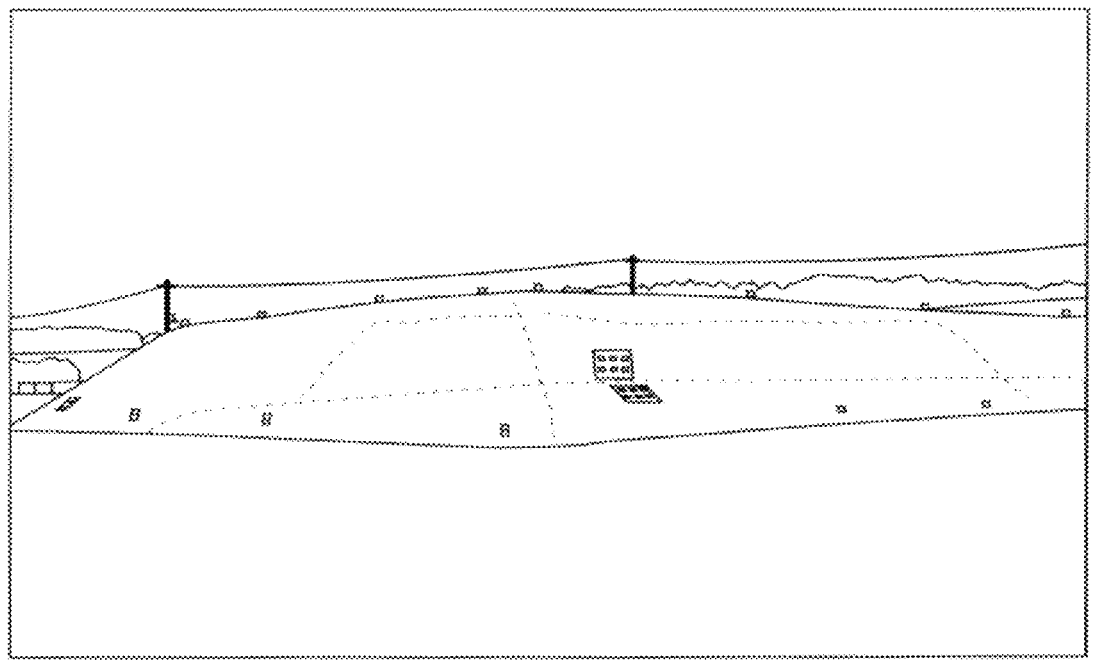
FIG. 25 shows an example of a large and/or wide measuring object.

FIG. 24 is a diagram showing an example in which color-coded targets and retro targets are together used as identifiable marks. Color-coded targets (A10 to A13) and retro targets (T10 T11, and so forth) are affixed to an earthenware as the measuring object 2. For example, when the retro target T10 is in the triangle formed by the color-coded targets (A10 to A12) and its positional relationship with the color-coded targets (A10 to A12) is identified, it becomes identifiable. The retro target T11 is in the triangle formed by the color-coded targets (A11 to A13). When its positional relationship with the color-coded targets (A11 to A13) is identified, it becomes identifiable. For example, the non-coded mark can be identifiable based on the direction and distance from the mark having a particular code, the distance between the non-coded mark and the projection point (the intersection of the vertical lines) to the triangle formed by the three marks having the particular codes, or the like. Using such a feature, the retro targets (T10, T11, and so forth) which are non-coded marks can be used as identifiable marks. Alternatively, the arrangement relationship is projected into a three-dimensional space, and the non-coded mark may be identified based on the correspondence in the arrangement relationship. A non-coded mark identification section (not shown in drawing) identifies the non-coded marks extracted by the mark extraction section 71 based on the arrangement relationship with respect to the other marks having the self-other identifiable identification codes and provides mark symbols to the non-coded marks which have become identifiable based on the arrangement relationship. Accordingly, multiple retro targets can be used as identifiable marks, thus enabling highly accurate three-dimensional measurement with a few color-coded targets.

The present invention can be realized as an image photographing method for three-dimensional measurement described in the flowcharts and so forth of the aforementioned embodiments and as a program for allowing the image photographing device for three-dimensional method to execute the method. The program may be used while being stored in an internal storage section of the image photographing device for three-dimensional measurement or stored in an external storage device, or may be used by downloading from the internet. This invention may also be implemented as a storage medium storing the program.

As described in the foregoing, according to the embodiments of present invention, the image photographing device for three-dimensional measurement can be provided that enables efficient photographing with just sufficient images in a case that a photographer uses a single camera to photograph while moving.

The embodiments of the present invention have been described above. However, it should be understood that this invention is not limited to the aforementioned embodiments, but it is matter of course that various modifications may be made to the embodiments without departing from the scope of the present invention.

For example, in the above embodiments, the examples are described in which the number of photographing times of marks or photographed areas is indicated, a two-dimensional or three-dimensional photographing range image is indicated, mark data input in a photographing range image are previously determined values or three-dimensional coordinates obtained by measurement, a photographing range image or live image is displayed on a display screen, a number of photographing times that is a number of times of photographing already conducted or number of times of photographing conducted after last photographing is used as the number of photographing times, and the like. However, all such features can be selected as desired. Further, the photographing range image can be indicated so that it can be compared with a live image. Linking the photographing range image to the live image, marks or photographed areas in the area of the photographing range image that corresponds to the live image may be indicated with a number of times of photographing after last photographing. The size of a photographed area can be changed as desired by changing the combination of the marks surrounding the photographed area. For example, in the case that the number of photographing times is fixed at three times, the combination of marks is selected so that each of the photographed areas surrounded thereby occupies approximately ⅓ of each of the entire photographed images, and the photographer moves to obtain images so that ⅓ of the photographed image changes every time. Taking a pair of images in a pair of positions in the distance of one step at an arbitrary photographing position allows constant obtainment of substantially stereoscopic images, thus facilitating use in orientation and three-dimensional measurement. Switch between display before photographing and after photographing during the comparison between a live image and an already-photographed image may be allowed. A photographed range image may be expressed by ortho image, panoramic image (including images formed by photographing a measuring object all around and then coupling the image portions), texture image, wire frame image, bird's eye view, other than perspective view. Further, indication of number of photographing times, a way of grouping, the number of affixed marks, and so forth can be appropriately changed.

INDUSTRIAL APPLICABILITY

The present image photographing devices can be used for image photographing for three-dimensional measurement in cases of photographing a measuring object all around, a large measuring object, a measuring object in a complicated shape, and so forth.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

DESCRIPTION OF REFERENCE NUMERALS AND SYMBOLS 1, 1A: image photographing device for three-dimensional measurement
2: measuring object
3: photographing section
4: display section
5: storage section
6: inputting section
7: characteristic (feature) extraction section
8: image processing section
9: three-dimensional position measurement section
10: control section
11: live image
12: already-photographed image
15: personal computer (PC)

51: photographed image storage section
52: mark photographing time number storage section
53: area photographing time number storage section
54: photographed area portion storage section
61: mark data inputting section
71: mark extraction section
72: code identification section
81: photographed area defining section
82: mark photographing time number counting section
83: area photographing time number counting section
84: mark grouping section
85: photographed area grouping section
86: photographing range image formation section
200: retro target
204: inner circular portion
206: outer circular portion
A1 to A8, A10 to A13: color-coded target
CT: color-coded target
P1: retro target part
P2: reference color part
P3: color code part
P4: white part
T1 to T8, T10, T11: retro target
To: threshold

The invention claimed is:

1. An image photographing device for three-dimensional measurement for sequentially photographing a measuring object in an overlapping manner with a single camera, the image photographing device comprising:
   a photographing section configured to photograph the measuring object to which marks having self-other identifiable identification codes are affixed in a predetermined condition;
   a mark extraction section configured to extract the marks from a photographed image photographed by the photographing section;
   a code identification section configured to identify the identification codes of the marks extracted by the mark extraction section and correlating the identification codes with mark symbols provided to the marks;
   a photographed area defining section configured to identify the mark symbols of the marks in the photographed image extracted from positions in a screen with the identified identification codes and to define and divide an area of the measuring object in the photographed image into photographed areas each of which is surrounded by at least three marks (each of the areas including the at least 3 marks) with identified mark symbols, and each of divided photographed areas does not overlap each other;
   an area photographing time number counting section configured to count a number of photographing times of each of the photographed areas which are involved in different photographed images;
   a photographed area grouping section configured to group the photographed areas divided into at least two groups in response to the number of photographing times of each of the photographed areas by the photographed area defining section;
   a mark data inputting section configured to input positions of the marks affixed to the measuring object in a coordinate space of a photographing range image for expressing a photographing range of the measuring object in a two-dimension or three-dimension space while correlating the positions of the marks with the mark symbols;
   a photographing range image formation section configured to connect the positions of the marks input in the photographing range image such that the mark symbols of the marks surrounding each of the photographed areas correspond to each other and thereby matching the photographed areas into the photographing range image; and
   a display section configured to display the photographed areas matched into the photographing range image such that the photographed areas are grouped into the at least two groups,
   wherein the area photographing time number counting section is configured to count the number of times of successful extractions of all the marks surrounding the photographed area as the number of photographing times of the photographed area.

2. The image photographing device for three-dimensional measurement according to claim 1,
   wherein the at least two groups are an overlap photographed area group and a non-overlap photographed area group.

3. The image photographing device for three-dimensional measurement according to claim 1,
   wherein the predetermined condition is that a number of the marks having the self-other identifiable identification codes are previously determined;
   further comprising a mark photographing time number counting section configured to count the number of photographing times of each of the marks which are involved in different photographed images; and
   wherein the photographed area grouping section is configured to group at least one photographed area surrounded by marks of a number of photographing times of 0 into the unphotographed area group.

4. The image photographing device for three-dimensional measurement according to claim 3,
   wherein the at least two groups are an already-photographed area group and the unphotographed area group, or are an at-least-thrice photographed area group, a twice photographed area group, a once photographed area group, and the unphotographed area group.

5. The image photographing device for three-dimensional measurement according to claim 1,
   wherein the display section is configured to display the photographed areas in the photographing range image in colors correlated with the groups.

6. The image photographing device for three-dimensional measurement according to claim 1,
   wherein the predetermined condition is that position coordinates of the marks are previously designated, and the positions of the marks input in the photographing range image are the previously designated position coordinates.

7. The image photographing device for three-dimensional measurement according to claim 1,
   further comprising a three-dimensional position measurement section configured to obtain three-dimensional coordinates of the positions of the marks based on positions of the marks extracted by the mark extraction section in the photographed image on the screen;
   wherein the positions of the marks input in the photographing range image are the three-dimensional coordinates obtained by the three-dimensional position measuring section.

8. The image photographing device for three-dimensional measurement according to claim 1, further comprising a photographed area portion storage section configured to extract an image of each of the photographed areas from the photographed images and to store the extracted image,
wherein the photographing range image forming section is configured to extract the image of each of the photographed areas from the photographed area portion storage section, to expand or contract the image of each of the photographed areas to affix, and to affix the image to the photographing range image such that at least three marks surrounding the photographed area correspond to the positions of the marks input in the photographing range image.

9. The image photographing device for three-dimensional measurement according to claim 1, further comprising:
a photographed area portion storage section configured to extract the image of each of the photographed areas from the photographed image and to store the extracted image; and
a boundary line formation section configured to extract a plurality of characteristic points in a vicinity of a boundary of the photographed image, to draw a boundary line in each of the photographed areas including the characteristic points, and to store the boundary line in the photographed area portion storage section,
wherein the photographing range image formation section is configured to use the boundary line drawn in each of the photographed areas stored in the photographed area portion storage section to form a camera photographing range for indicating a range of each of the photographed images in the photographing range image, and
the display section is configured to indicate the camera photographing range in each of the photographed images, in the photographing range image.

10. The image photographing device for three-dimensional measurement according to claim 1,
wherein in a case that a portion of the photographed area of one photographed image overlaps with the photographed area of another photographed image, the photographed area defining section is configured to divide the photographed area of the one photographed image into an overlapping portion and a non-overlapping portion, to set the overlapping portion and the non-overlapping portion as new photographed areas, and to provide new photographed area numbers to the new photographed areas.

11. The image photographing device for three-dimensional measurement according to claim 1,
wherein in a case that a plurality of photographed areas with the same number of photographing times are present next to each other, the photographed area defining section is configured to integrate the plurality of photographed areas into a single photographed area, as a new photographed area, and to provide a new photographed area number to the new photographed area.

12. The image photographing device for three-dimensional measurement according to claim 1,
wherein the self-other identifiable identification code is any one of number string, character string, sign, barcode, two-dimensional barcode, and color code.

13. The image photographing device for three-dimensional measurement according to claim 1,
wherein the photographing section is configured to obtain a live image by photographing of the measuring object at a present position by a moving photographer, and the display section is configured to display the photographing range image and the live image on the same screen.

14. The image photographing device for three-dimensional measurement according to claim 1,
wherein the photographed range image is expressed by texture image.

15. An image photographing method for three-dimensional measurement of sequentially photographing a measuring object in an overlapping manner with a single camera, the image photographing method comprising:
a photographing step of photographing the measuring object to which marks having self-other identifiable identification codes are affixed in a predetermined condition;
a mark extraction step of extracting the marks from a photographed image photographed by the photographing step;
a code identification step of identifying the identification codes of the marks extracted by the mark extraction step and correlating the identification codes with mark symbols provided to the marks;
a photographed area defining step of identifying the mark symbols of the marks in the photographed image extracted from positions on a screen with the identified identification codes and for defining and dividing an area of the measuring object in the photographed image into photographed areas each of which is surrounded by at least three marks (each of the areas including the at least 3 marks) with identified mark symbols, and each of divided photographed areas does not overlap each other;
an area photographing time number counting step of counting a number of photographing times of each of the photographed areas which are involved photographed images;
a photographed area grouping step of grouping the photographed areas divided into at least two groups in response to the number of photographing times of each of the photographed areas in the photographed area defining step;
a mark data inputting step of inputting positions of the marks affixed to the measuring object in a coordinate space of a photographing range image for expressing a photographing range of the measuring object in a two-dimension or three-dimension space while correlating the positions of the marks with the mark symbols;
a photographing range image forming step of connecting with lines the positions of the marks input in the photographing range image such that the mark symbols of the marks surrounding each of the photographed areas correspond to each other and thereby matching the photographed areas into the photographing range image; and
a display step of displaying the photographed areas matched into the photographing range image such that the photographed areas are grouped into the at least two groups,
wherein the area photographing time number counting section counts the number of times of successful extractions of all the marks surrounding the photographed area as the number of photographing times of the photographed area.

16. The image photographing method for three-dimensional measurement according to claim 15,
wherein the photographed range image is expressed by texture image.

* * * * *